(12) United States Patent
Hiruma et al.

(10) Patent No.: US 11,999,180 B2
(45) Date of Patent: Jun. 4, 2024

(54) RECORDING METHOD AND RECORDING DEVICE

(71) Applicant: Seiko Epson Corporation, Tokyo (JP)

(72) Inventors: Kei Hiruma, Chino (JP); Hiroshi Takiguchi, Matsumoto (JP); Masaru Terada, Suwa (JP); Shintaro Asai, Matsumoto (JP); Hiroaki Kida, Shiojiri (JP); Tomoyuki Ushiyama, Chino (JP)

(73) Assignee: SEIKO EPSON CORPORATION (JP)

( * ) Notice: Subject to any disclaimer, the term of this patent is extended or adjusted under 35 U.S.C. 154(b) by 219 days.

(21) Appl. No.: 17/562,120

(22) Filed: Dec. 27, 2021

(65) Prior Publication Data

US 2022/0203740 A1 Jun. 30, 2022

(30) Foreign Application Priority Data

Dec. 28, 2020 (JP) .................................. 2020-218887

(51) Int. Cl.
| | |
|---|---|
| *B41M 5/00* | (2006.01) |
| *C09D 11/033* | (2014.01) |
| *C09D 11/037* | (2014.01) |
| *C09D 11/322* | (2014.01) |
| *C09D 11/36* | (2014.01) |

(52) U.S. Cl.
CPC ......... *B41M 5/0023* (2013.01); *C09D 11/033* (2013.01); *C09D 11/037* (2013.01); *C09D 11/322* (2013.01); *C09D 11/36* (2013.01)

(58) Field of Classification Search
CPC .. B41M 5/0023; C09D 11/033; C09D 11/037; C09D 11/322; C09D 11/36; B41J 2002/14241; B41J 2002/14411; B41J 2002/14419; B41J 2202/12; B41J 2/14233
See application file for complete search history.

(56) References Cited

U.S. PATENT DOCUMENTS

| | | | |
|---|---|---|---|
| 2015/0096466 A1* | 4/2015 | Denda ..................... | C08K 5/52 106/503 |
| 2018/0178538 A1 | 6/2018 | Miyazawa et al. | |

FOREIGN PATENT DOCUMENTS

| | | | | |
|---|---|---|---|---|
| CN | 109130504 A | * | 1/2019 | .......... B41J 2/14201 |
| JP | 2016011426 A | * | 1/2016 | |
| JP | 2018-103616 A | | 7/2018 | |

OTHER PUBLICATIONS

Sugai, Keigo (CN 109130504 A), "Liquid Ejecting Device and Liquid Ejecting Method", Jan. 4, 2019, [Abstract, First Embodiment: Paragraphs 0001-0004, and Other Embodiments, Paragraph 0014]. (Year: 2019).*

(Continued)

*Primary Examiner* — Lisa Solomon
(74) *Attorney, Agent, or Firm* — Harness, Dickey & Pierce, P.L.C.

(57) ABSTRACT

A recording method of the present disclosure, which is a recording method of performing recording on a recording medium by using a recording device including an ink jet head, includes ejecting a composition for ink jet from the ink jet head, in which the composition for ink jet contains a metal pigment, the metal pigment is formed of a plurality of scaly metal particles, the ink jet head includes a circulation flow path for circulating the composition for ink jet, and an average thickness of the metal particles determined by atomic force microscopy is 19 nm or less.

20 Claims, 2 Drawing Sheets

(56) References Cited

OTHER PUBLICATIONS

Moriyama, Hidekazu et al. (JP 2016011426 A), "Method for Producing Surface-Treated Metal Particle", Jan. 2, 20161, [Abstract, Surface-Treated Metal Particles: 0001-0004, 0007, Specific Examples (Sample No. 1): Paragraphs 0001-0014]. (Year: 2016).*

* cited by examiner

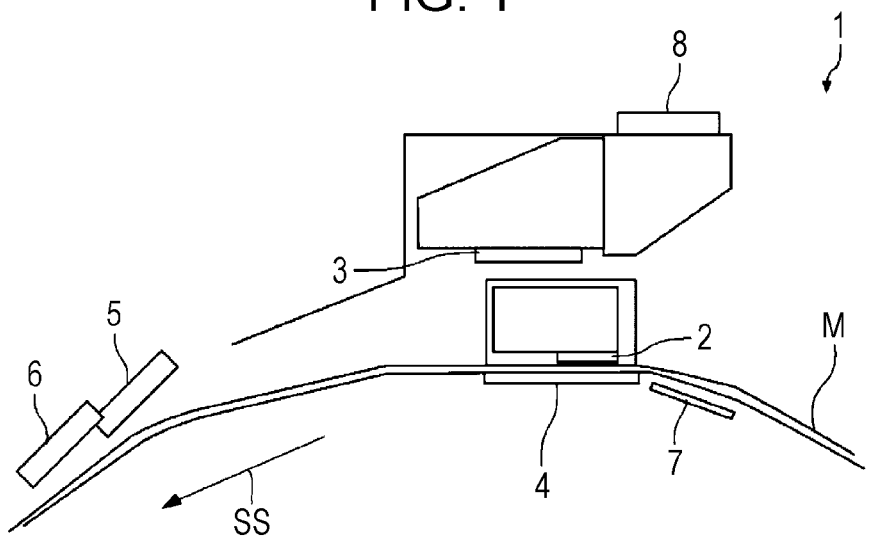
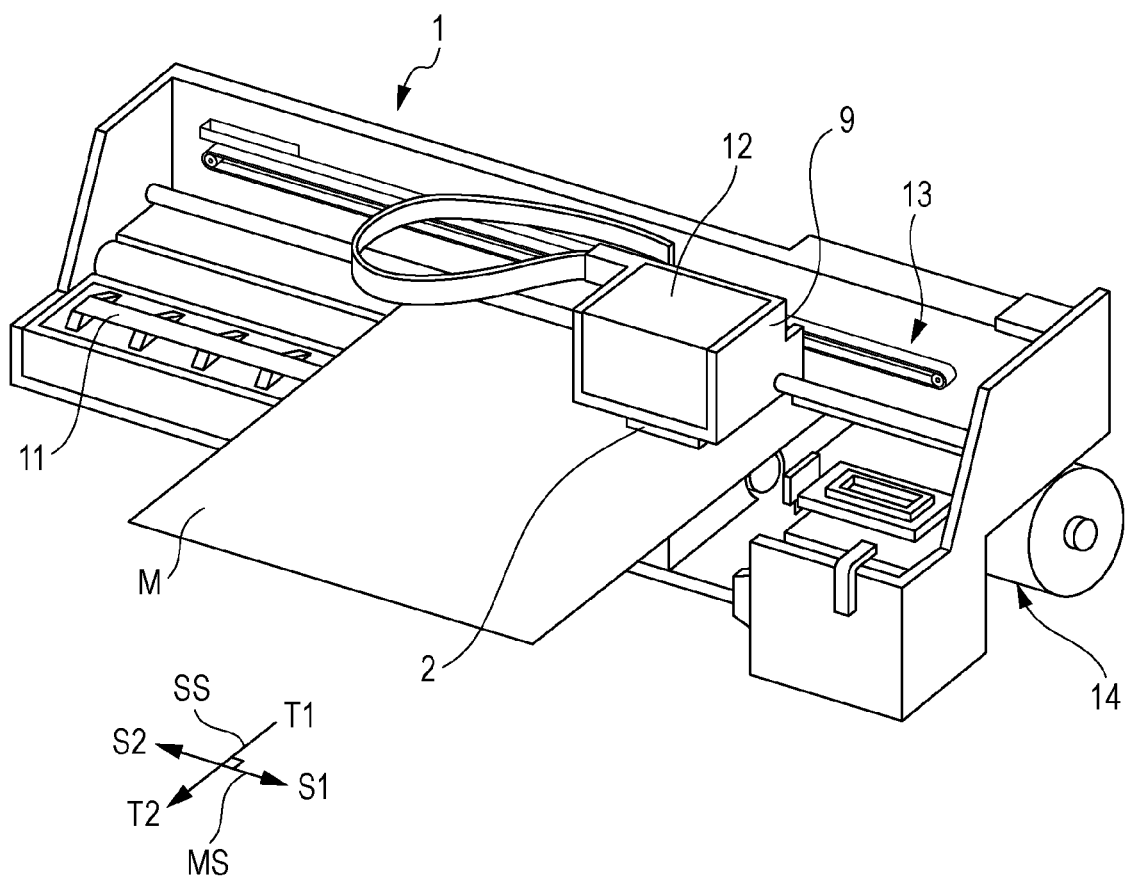

RECORDING METHOD AND RECORDING DEVICE

The present application is based on, and claims priority from JP Application Serial Number 2020-218887, filed Dec. 28, 2020, the disclosure of which is hereby incorporated by reference herein in its entirety.

BACKGROUND

1. Technical Field

The present disclosure relates to a recording method and a recording device.

2. Related Art

Metal plating, foil stamping using a metal foil, thermal transfer using a metal foil, and the like have been used in the related art as a method for manufacturing a decorative product having a glossy appearance.

However, the methods had problems that it is difficult to form fine patterns or apply the methods to a curved surface portion.

Meanwhile, a recording method of applying a composition containing a pigment or a dye to a recording medium by an ink jet method has been used. Such a method can be favorably applied for forming fine patterns and recording on a curved surface portion, which is advantageous.

In order to obtain a recorded matter exhibiting high metal gloss and a mirror finishing property, a method for producing a recorded matter by using an ink containing silver particles, which are metal particles, instead of common pigments or dyes (see JP-A-2018-103616).

However, when the ink containing metal particles is applied to an ink jet method, there arises a problem that the metal particles in the ink precipitate in an ink jet head.

Particularly, when the metal particles are scaly particles, local retention is likely to occur in the ink jet head, and precipitation is likely to occur.

Therefore, there is a problem that a density of metal particles in the ink ejected from the ink jet head becomes uneven and metal glossiness of the obtained recorded matter is not stable.

SUMMARY

The present disclosure can be realized in the following application examples.

According to an application example of the present disclosure, there is provided a recording method of performing recording on a recording medium by using a recording device including an ink jet head, the recording method including ejecting a composition for ink jet from the ink jet head, in which the composition for ink jet contains a metal pigment, the metal pigment is formed of a plurality of scaly metal particles, the ink jet head includes a circulation flow path for circulating the composition for ink jet, and an average thickness of the metal particles determined by atomic force microscopy is 19 nm or less.

In the recording method according to another application example of the present disclosure, a content of the metal particles in the composition for ink jet may be 0.2% by mass or more and 4.0% by mass or less.

In the recording method according to another application example of the present disclosure, the metal particles may be formed of a material containing aluminum or an aluminum alloy.

In the recording method according to another application example of the present disclosure, the metal particles may be surface-treated with a phosphorus compound or a silicon compound.

In the recording method according to another application example of the present disclosure, a volume average particle size D50 of the metal particles may be 0.20 or more and 1.00 µm or less.

In the recording method according to another application example of the present disclosure, an average aspect ratio of the metal particles, which is a ratio of a volume average particle size D50 of the metal particles to the average thickness of the metal particles determined by the atomic force microscopy, may be 20 or more and 2,000 or less.

In the recording method according to another application example of the present disclosure, the average thickness of the metal particles determined by the atomic force microscopy may be 5 nm or more and 19 nm or less.

In the recording method according to another application example of the present disclosure, the composition for ink jet may be a solvent-based ink.

In the recording method according to another application example of the present disclosure, a ratio of a circulation flow rate of the composition for ink jet flowing through the circulation flow path to a maximum ejection amount of the ink jet head may be 0.50 or more and 15 or less.

Further, according to an application example of the present disclosure, there is provided a recording device including an ink jet head, in which the ink jet head includes a circulation flow path for circulating a composition for ink jet, and the recording method according to the application example of the present disclosure is performed.

BRIEF DESCRIPTION OF THE DRAWINGS

FIG. 1 is a schematic cross-sectional view illustrating an example of a recording device.

FIG. 2 is a perspective view illustrating a configuration around a carriage of the recording device illustrated in FIG. 1.

DESCRIPTION OF EXEMPLARY EMBODIMENTS

Figure 3:
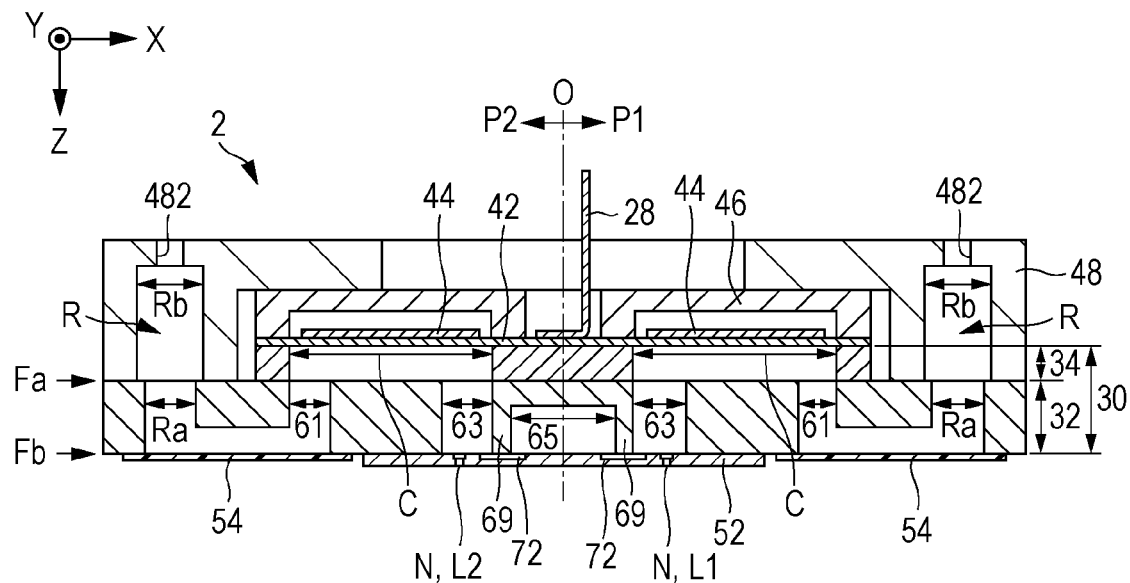
FIG. 3 is a schematic view of a cross section of an ink jet head of the recording device.

Hereinafter, preferred embodiments of the present disclosure will be described in detail.

1 Recording Method

First, a recording method of the present disclosure will be described.

A recording method of the present disclosure, which is a recording method of performing recording on a recording medium by using a recording device including an ink jet head, includes ejecting a composition for ink jet containing a metal pigment formed of a plurality of scaly metal particles from the ink jet head. The ink jet head is provided with a circulation flow path for circulating the composition for ink jet. Further, an average thickness of the metal particle determined by atomic force microscopy is 19 nm or less.

With such a configuration, it is possible to provide a recording method capable of effectively preventing unintended precipitation of the metal pigment in the ink jet head and stably producing a recorded matter having an excellent glossiness.

Obtaining the above-described excellent effect is considered for the following reasons. That is, by circulating the composition for ink jet containing the metal pigment satisfying a predetermined condition, when the composition for ink jet flows through a narrow flow path in the ink jet head including the circulation flow path, the metal particles are favorably oriented so that a plane direction of the scaly metal particles, that is, a direction intersecting with a thickness direction of the metal particles is substantially parallel to a direction in which the composition for ink jet flows. As such, the metal particles are oriented in a preferable form, such that a flow path resistance is reduced when the composition for ink jet flows through the narrow flow path in the ink jet head, and the metal particles flow favorably, thereby favorably preventing the precipitation of the metal particles. Further, in the metal pigment containing the scaly metal particles, the metal particles agglomerate so that main surfaces of the metal particles comes into contact with each other. However, even when the agglomeration occurs, the thickness of the metal particles is sufficiently reduced as described above, such that it is possible to reduce a thickness of agglomerate and it is possible to favorably prevent the flow of metal particles from being stagnant. In addition, even once the agglomerate is produced, an agglomerated state is released by circulation through the circulation flow path, and the composition for ink jet with each metal particle being independent is favorably ejected from a nozzle. For this reason, it is considered that the excellent effect described above is obtained.

On the other hand, when the conditions as described above are not satisfied, satisfactory results are not obtained. For example, when a shape of the metal particles is not scaly, spherical, or the like, the recorded matter produced has a significantly inferior glossiness.

Furthermore, though the metal particle is scaly, when the average thickness of the metal particles is excessively large, the agglomeration of metal particles in the ink jet head cannot be sufficiently prevented even if the ink jet head ejecting the composition for ink jet including the circulation flow path, and once the agglomerate of metal particles is produced, it is difficult to release the agglomerated state. As a result, ejection stability of the composition for ink jet produced by an ink jet method is lowered, and a recorded matter having an excellent glossiness cannot be stably produced.

Further, when the ink jet head ejecting the composition for ink jet does not include the circulation flow path, the precipitation or agglomeration of metal particles in the ink jet head cannot be sufficiently prevented, and once the metal particles are precipitated or the agglomeration of metal particles is produced, it is difficult to release the precipitated state or agglomerated state of the metal particles. As a result, ejection stability of the composition for ink jet produced by an ink jet method is lowered, and a recorded matter having an excellent glossiness cannot be stably produced.

1-1 Ejecting Step

In an ejecting step, the composition for ink jet is ejected toward the recording medium from the ink jet head.

The composition for ink jet ejected in ejecting step contains a metal pigment. The metal pigment is formed of a plurality of scaly metal particles, and an average thickness of the metal particles determined by the atomic force microscopy is 19 nm or less.

The composition for ink jet used in the ejecting step and a recording device including the ink jet head ejecting the composition for ink jet will be described in detail.

As recording medium to which the composition for ink jet is applied, any recording medium or either an absorbent or non-absorbent recording medium may be used, and examples thereof can include paper such as plain paper and special paper for ink jet, natural fibers/synthetic fibers such as plastic materials, metal, ceramics, wood, shells, cottons, polyester, and wool, non-woven fabrics, and the like. In addition, the shape of the recording medium is not particularly limited, and may be any shape such as a sheet shape.

Moreover, a pattern in which the composition for ink jet is applied to the recording medium, an amount of applying the composition for ink jet to the recording medium per unit area, and the like are appropriately adjusted according to a recorded matter to be produced, but are not particularly limited.

1-2 Circulating Step

The ink jet head ejecting the composition for ink jet includes a circulation flow path for circulating the composition for ink jet, and the recording method of the present disclosure includes a circulating step of circulating the composition for ink jet by the ink jet head.

As a result, the effect of the present disclosure as described above is exhibited.

The circulating step may be performed simultaneously with the ejecting step, or may be performed at a timing when the ejecting step is not performed. For example, the circulating step may be performed only at the timing when the ejecting step is not performed, such as when the ejecting step is stopped or when the recording device is idling, but at least a part of the circulating step is performed simultaneously with the ejecting step.

As a result, the effect described above is more effectively exhibited.

A lower limit of the ratio of a circulation flow rate of the composition for ink jet flowing through the circulation flow path to a maximum ejection amount of the ink jet head is preferably 0.50, more preferably 0.60, still more preferably 0.70, and most preferably 0.75. In addition, an upper limit of the ratio of the circulation flow rate of the composition for ink jet flowing through the circulation flow path to a maximum ejection amount of the ink jet head is preferably 15, more preferably 10, still more preferably 5.0, and most preferably 3.0.

As a result, the effect described above can be exhibited while preventing the circulation flow rate of the composition for ink jet flowing through the circulation flow path from being excessively large.

The maximum ejection amount of the composition for ink jet refers to an ejection amount of the composition for ink jet ejected from the ink jet head, when the composition for ink jet is tentatively ejected from all nozzles used for the recording of the ink jet head at the maximum ejection amount of droplets of the composition for ink jet per ejection performed in recording and at a maximum eject frequency of the ejection of the composition for ink jet performed in recording.

The circulation flow rate of the composition for ink jet flowing through the circulation flow path is the total of flow rates of the composition for ink jet flowing through discharge paths each of which is provided in the ink jet head of the composition for ink jet and coupled to the nozzle of the ink jet head.

The maximum ejection amount or the flow rate of the composition for ink jet flowing through the circulation flow path can be expressed as mass per unit time.

1-3 Dispersion Medium Removing Step

A dispersion medium removing step of removing a dispersion medium having a function of dispersing the metal pigment in the composition for ink jet from the composition for ink jet applied to the recording medium may be performed.

In the dispersion medium removing step, for example, the recording medium to which the composition for ink jet is applied is heat-treated, the recording medium to which the composition for ink jet is applied is placed under reduced-pressure atmosphere, or these methods can be performed in combination. Furthermore, the dispersion medium removing step may be performed by natural drying.

When the dispersion medium constituting the composition for ink jet has high volatility, the dispersion medium can be substantially removed without providing the dispersion medium removing step. More specifically, since the dispersion medium volatilizes in a relatively short time before or after droplets of the composition for ink jet land on the recording medium, it is not necessary to separately provide the dispersion medium removing step.

When the dispersion medium removing step is performed by heat treatment, a heating temperature in this step varies depending on the composition of the dispersion medium and is not particularly limited, but a lower limit of the heating temperature in this step is preferably 30° C., more preferably 40° C., and still more preferably 50° C. When the dispersion medium removing step is performed by heat treatment, an upper limit of the heating temperature in this step is preferably 100° C., more preferably 90° C., and still more preferably 80° C.

As a result, the dispersion medium remains undesirably in the final recorded matter, and occurrence of adverse effects on the recording medium or the like is effectively prevented, such that productivity of the recorded matter can be improved while enhancing reliability of the recorded matter. It is also advantageous in terms of energy saving.

When the dispersion medium removing step is performed by heat treatment, a heating time in this step varies depending on the composition of the dispersion medium, the heating temperature, or the like, and is not particularly limited, but a lower limit of the heating time in this step is preferably 10 minutes, preferably 20 minutes, and still more preferably 30 minutes. When the dispersion medium removing step is performed by heat treatment, an upper limit of the heating time in this step is preferably 60 minutes, more preferably 50 minutes, and still more preferably 40 minutes.

As a result, the dispersion medium remains undesirably in the final recorded matter, and occurrence of adverse effects on the recording medium or the like is effectively prevented, such that productivity of the recorded matter can be improved while enhancing reliability of the recorded matter. It is also advantageous in terms of energy saving.

When the dispersion medium removing step is performed by heat treatment, a heating method is not particularly limited, but examples thereof include a heat press method, a normal pressure steam method, a high pressure steam method, or a thermal fixing method.

Further, a heat source in heating is not particularly limited, but for example, an infrared lamp or the like can be used.

1-4 Other Steps

The recording method of the present disclosure may have steps other than those described above.

For example, when the composition for ink jet contains a curable resin as a binder, the recording method may include a curing step of curing the curable resin.

The curing step can be performed by selecting a method according to a type of the curable resin. For example, when the curable resin is a thermosetting resin, the curing step can be performed by heat treatment. In addition, when the curable resin is a photocurable resin, the curing step can be performed by light irradiation treatment.

1-5 Composition for Ink Jet

Next, the composition for ink jet applied to the recording method of the present disclosure will be described in detail.

1-5-1 Metal Pigment

The composition for ink jet according to the present disclosure contains a metal pigment formed of a plurality of metal particles.

The metal particle is such that at least a part of a portion visible in appearance is formed of a metal material, and usually, the vicinity of the outer surface is formed of a metal material.

The metal particle is a component that has a great influence on the appearance of a recorded matter produced by using the recording method and the recording device of the present disclosure.

The metal particle may be such that a region including the vicinity of the surface may be at least formed of the metal material, for example, the entire metal particle may be formed of the metal material, or the metal particle may have a base formed of a non-metal material and a coating film formed of the metal material that covers the base. In addition, the metal particle may have an oxidized coating film or the like formed on the surface thereof, such as a passivation film. Even such a metal particle has the problem as described above in the related art, and is applied to the present disclosure, such that the excellent effect as described above is obtained.

As the metal material constituting the metal particle, a metal as a simple substance, various alloys, or the like can be used. Examples of the metal material include aluminum, silver, gold, platinum, nickel, chromium, tin, zinc, indium, titanium, iron, and copper. Among these, the metal particle is preferably formed of a material containing aluminum or an aluminum alloy.

As a result, the metal particles satisfying the above-described conditions are effectively prevented from undesirably precipitating or being agglomerated in the ink jet head, and ejection stability of the composition for ink jet can be further enhanced. In addition, the glossiness and luxuriousness of the recorded matter can be particularly enhanced while suppressing an increase in production costs of the recorded matter.

In the present disclosure, the metal particles are scaly.

Thus, the metal particles can be arranged on the recording medium to which the composition for ink jet is applied so that the main surface thereof follows the surface shape of the recording medium. As a result, the glossiness and the like originally inherent in the metal material constituting the metal particles can be more effectively exhibited even in the obtained recorded matter, the glossiness and luxuriousness of a formed printed portion can be particularly enhanced, and abrasion resistance of the recorded matter can be particularly enhanced.

In the present disclosure, the scaly shape refers to a shape in which an area when observed from a predetermined angle, for example, when viewed in a plan view is larger than an area when observed from an angle orthogonal to the observation direction, such as a flat plate shape, a curved plate shape, or the like. Particularly, a ratio $S_1/S_0$ of an area $S_1$ [μm$^2$] when observed from a direction having a maximum projected area, that is, when viewed in a plan view to an area $S_0$ [μm$^2$] when observed from the direction having the maximum area when observed from the direction orthogonal to the observation direction is preferably 2 or more, more preferably 5 or more, and still more preferably 8 or more. For example, as the value of ratio $S_1/S_0$, an average value of values obtained by observing any 50 particles and calculating the particles can be adopted. The observation can be performed using, for example, an electron microscope, an atomic force microscope, or the like.

The average thickness of the metal particles determined by the atomic force microscopy may be 19 nm or less, preferably 17 nm or less, and more preferably 15 nm or less. Further, a lower limit of the average thickness of the metal particles determined by the atomic force microscopy is preferably 5 nm, more preferably 6 nm, and still more preferably 7 nm.

As a result, the effect described above is more effectively exhibited.

A lower limit of the volume average particle size D50 of the metal particles is not particularly limited, but preferably 0.20 μm, more preferably 0.25 μm, and still more preferably 0.30 μm. In addition, an upper limit of the volume average particle size D50 of the metal particles is not particularly limited, but preferably 1.00 μm, more preferably 0.90 μm, and still more preferably 0.80 μm.

As a result, as storage stability of the composition for ink jet, ejection stability by the ink jet method, and the like are further enhanced, the glossiness of the recorded matter produced using the composition for ink jet can be further enhanced, and occurrence of undesired color unevenness can be further effectively prevented.

In the present specification, the volume average particle size refers to a median diameter of a volume distribution obtained by measuring a particle dispersion using a laser diffraction/scattering method, and is a size of particles that exactly represents 50% of a median value in cumulation when a large number of measurement results are represented as a cumulative abundance ratio for each size.

A lower limit of an average aspect ratio of the metal particles, which is a ratio of the volume average particle size D50 of the metal particles to the average thickness of the metal particles determined by the atomic force microscopy, is preferably 10, more preferably 20, still more preferably 22, and most preferably 24. In addition, an upper limit of the average aspect ratio of the metal particles, which is a ratio of the volume average particle size D50 of the metal particles to the average thickness of the metal particles determined by the atomic force microscopy, is preferably 2,000, more preferably 200, and still more preferably 50.

As a result, as storage stability of the composition for ink jet, ejection stability by the ink jet method, and the like are further enhanced, the glossiness of the recorded matter produced using the composition for ink jet can be further enhanced, and occurrence of undesired color unevenness can be further effectively prevented.

The average aspect ratio of the metal particles can be determined by measuring a dispersion in which the metal particles are dispersed using the laser diffraction/scattering method.

A lower limit of a content of the metal particles in the composition for ink jet is not particularly limited, but preferably 0.2% by mass, more preferably 0.3% by mass, and still more preferably 0.4% by mass. In addition, an upper limit of the content of the metal particles in the composition for ink jet is not particularly limited, but preferably 4.0% by mass, more preferably 3.5% by mass, and still more preferably 3.0% by mass.

As a result, as storage stability of the composition for ink jet, ejection stability by the ink jet method, and the like are further enhanced, the glossiness of the recorded matter produced using the composition for ink jet can be further enhanced, and occurrence of undesired color unevenness can be further effectively prevented.

The metal particles may be produced by any method. However, when the metal particles are formed of Al, the metal particles may be obtained by forming a film formed of Al by a vapor-phase film formation method, and then pulverizing the film, which is preferable. As a result, it is possible to further effectively exhibit the glossiness and the like originally inherent in Al in the printed portion formed by using the recording method and the recording device of the present disclosure. Further, it is possible to suppress variations in properties among the particles. Further, it is possible to favorably produce relatively thin metal particles by using the method.

When the metal particles are produced using such a method, the metal particles can be favorably produced, for example, by forming a film formed of Al on a base material. As the base material, for example, a plastic film such as polyethylene terephthalate can be used. In addition, the base material may have a release agent layer on a film-forming surface.

Further, the pulverization is preferably performed by applying ultrasonic vibrations to the film in a liquid. As a result, the metal particles having a particle size as described later can be easily and reliably obtained, and variations in size, shape, and properties among the metal particles can be suppressed.

When the pulverization is performed by the above described method, alcohols, a hydrocarbon compound, an ether compound, or a polar compound such as propylene carbonate, γ-butyrolactone, N-methyl-2-pyrrolidone, N,N-dimethylformamide, N,N-dimethylacetamide, dimethyl sulfoxide, cyclohexanone, or acetonitrile, and the like can be suitably used. By using such a liquid, the productivity of the metal particles is particularly enhanced while preventing undesired oxidation of the metal particles, and the variations in size, shape, and properties of the metal particles among the particles can be particularly reduced.

Examples of alcohols include methanol, ethanol, propanol, butanol, and the like. In addition, examples of the hydrocarbon compound include n-heptane, n-octane, decane, dodecane, tetradecane, toluene, xylene, cymene, durene, indene, dipentene, tetrahydronaphthalene, decahydronaphthalene, cyclohexylbenzene, and the like. In addition, examples of ether compound include ethylene glycol dimethyl ether, ethylene glycol diethyl ether, ethylene glycol methyl ethyl ether, diethylene glycol dimethyl ether, diethylene glycol diethyl ether, diethylene glycol methyl ethyl ether, diethylene glycol monobutyl ether acetate, diethylene glycol n-butyl ether, tripropylene glycol dimethyl ether, triethylene glycol diethyl ether, 1,2-dimethoxyethane, bis(2-methoxyethyl)ether, p-dioxane, tetrahydrofuran, and the like.

1-5-2 Dispersion Medium

The composition for ink jet according to the present disclosure contains a dispersion medium having a function of dispersing the metal pigment.

When the composition for ink jet contains the dispersion medium, the composition for ink jet can be ejected by ink jet.

The dispersion medium is not particularly limited as long as it is a liquid having a function of dispersing the metal pigment, but preferably formed of a liquid component other than water, particularly, an organic solvent as a main component. In other words, the composition for ink jet is preferably a solvent-based ink. An ink in which the solvent component is formed of an organic solvent as a main component is referred to as a solvent-based ink.

As a result, as storage stability of the composition for ink jet, ejection stability by the ink jet method, and the like are further enhanced, the glossiness of the recorded matter produced using the composition for ink jet can be further enhanced, and occurrence of undesired color unevenness can be further effectively prevented.

As described above, the composition for ink jet is preferably a solvent-based ink, but even in such a case, a small amount of water may be contained. However, when the composition for ink jet is a solvent-based ink, a content of water in the composition for ink jet is preferably 2.0% by mass or less, more preferably 1.0% by mass or less, and still more preferably 0.5% by mass or less.

Examples of the organic solvent can include an ester compound, an ether compound, hydroxy ketone, carbonic diester, a cyclic amide compound, and the like as a dispersion medium. More specifically, examples of the compound that can be used as a dispersion medium include 2-(2-methoxy-1-methylethoxy)-1-methylethylacetate, triethylene glycol dimethyl ether, triethylene glycol diacetate, diethylene glycol monoethyl ether acetate, 4-methyl-1,3-dioxolane-2-one, bis(2-butoxyethyl)ether, dimethyl glutarate, ethylene glycol di-n-butyrate, 1,3-butylene glycol diacetate, diethylene glycol monobutyl ether acetate, tetraethylene glycol dimethyl ether, 1,6-diacetoxyhexane, tripropylene glycol monomethyl ether, butoxypropanol, diethylene glycol methyl ethyl ether, diethylene glycol methyl butyl ether, triethylene glycol methyl ethyl ether, triethylene glycol methyl butyl ether, dipropylene glycol monomethyl ether acetate, diethylene glycol dimethyl ether, ethyl 3-ethoxypropionate, diethylene glycol ethyl methyl ether, 3-methoxybutyl acetate, diethylene glycol diethyl ether, ethyl octanoate, ethylene glycol monobutyl ether acetate, ethylene glycol monobutyl ether, cyclohexyl acetate, diethyl succinate, ethylene glycol diacetate, propylene glycol diacetate, 4-hydroxy-4-methyl-2-pentanone, dimethyl succinate, 1-butyl-2-propanol, diethylene glycol monoethyl ether, diethylene glycol monomethyl ether, dipropylene glycol monomethyl ether, 3-methoxy-n-butyl acetate, diacetin, dipropylene glycol mono-n-propyl ether, polyethylene glycol monomethyl ether, butyl glycolate, ethylene glycol monohexyl ether, dipropylene glycol mono-n-butyl ether, N-methyl-2-pyrrolidone, triethylene glycol butyl methyl ether, bis(2-propoxyethyl)ether, diethylene glycol diacetate, diethylene glycol butyl methyl ether, diethylene glycol butyl ethyl ether, diethylene glycol butylpropyl ether, diethylene glycol ethylpropyl ether, diethylene glycol methylpropyl ether, diethylene glycol propyl ether acetate, triethylene glycol methyl ether acetate, triethylene glycol ethyl ether acetate, triethylene glycol propyl ether acetate, triethylene glycol butyl ether acetate, triethylene glycol butyl ethyl ether, triethylene glycol ethyl methyl ether, triethylene glycol ethylpropyl ether, triethylene glycol methylpropyl ether, dipropylene glycol methyl ether acetate, n-nonyl alcohol, diethylene glycol mononormalbutyl ether, triethylene glycol monomethyl ether, ethylene glycol 2-ethylhexyl ether, triethylene glycol monoethyl ether, diethylene glycol monohexyl ether, triethylene glycol monobutyl ether, diethylene glycol mono-2-ethylhexyl ether, tripropylene glycol mono-n-butyl ether, butyl cellosolve acetate, γ-butyrolactone, and the like. One or two or more kinds selected from the compounds can be used in combination.

Among the above-described organic solvents, glycol ethers are preferable. Glycol ethers are etherified glycol compounds. Examples of glycol ethers include monoether and diether, and diether is more preferable. Examples of a glycol moiety of the glycol ethers include glycols such as glycol or glycol in which hydroxyl groups are intermolecularly condensed. Examples of a ether moiety of the glycol ethers include alkyl ethers and the like.

Among them, the dispersion medium preferably contains at least one of diethylene glycol diethyl ether, diethylene glycol methyl ethyl ether, and triethylene glycol monobutyl ether, more preferably contains at least one of diethylene glycol diethyl ether and diethylene glycol methyl ethyl ether.

As a result, as the storage stability of the composition for ink jet, the ejection stability by the ink jet method, and the like are further enhanced, the glossiness of the recorded matter produced using the composition for ink jet can be further enhanced, and occurrence of undesired color unevenness can be further effectively prevented.

A ratio of the sum of a content of diethylene glycol diethyl ether and a content of diethylene glycol methyl ethyl ether in the total dispersion medium constituting the composition for ink jet is preferably 40% by mass or more, more preferably 50% by mass or more, and still more preferably 70% by mass or more. An upper limit of the ratio is not particularly limited, but preferably 99% by mass or less, and more preferably 95% by mass or less.

As a result, the effect described above is more effectively exhibited.

A lower limit of the content of the dispersion medium (organic solvent) in the composition for ink jet is not particularly limited, but preferably 70.0% by mass, more preferably 80.0% by mass, and still more preferably 85.0% by mass. In addition, an upper limit of the content of the dispersion medium in the composition for ink jet is not particularly limited, but preferably 99.8% by mass, more preferably 99.5% by mass, and still more preferably 99.0% by mass.

As a result, as the storage stability of the composition for ink jet, the ejection stability by the ink jet method, and the like are further enhanced, the glossiness of the recorded matter produced using the composition for ink jet can be further enhanced, and occurrence of undesired color unevenness can be further effectively prevented.

1-5-3 Surface Treatment Agent

The metal particles contained in the composition for ink jet are preferably surface-modified with a surface treatment agent.

As a result, as dispersion stability of the composition for ink jet of the metal particles is improved, and the storage stability of the composition for ink jet, the ejection stability by the ink jet method, and the like are further enhanced, the glossiness of the recorded matter produced using the composition for ink jet can be further enhanced, and occurrence of undesired color unevenness can be further effectively prevented.

Particularly, the metal particle is preferably surface-treated with a phosphorus compound or a silicon compound.

As a result, as the dispersion stability of the composition for ink jet of the metal particles is further improved, and the storage stability of the composition for ink jet, the ejection stability by the ink jet method, and the like are further enhanced, the glossiness of the recorded matter produced using the composition for ink jet can be further enhanced, and occurrence of undesired color unevenness can be further effectively prevented.

The phosphorus compound that functions as a surface treatment agent is not particularly limited as long as it is a compound containing a phosphorus atom in a molecule and has a function of modifying the surface of the metal particle, that is, a phosphorus surface treatment agent. However, the phosphorus compound is preferably a hydrophobic phosphorus surface treatment agent having a function of enhancing hydrophobicity as compared with the metal particle to which the phosphorus compound does not adhere while adhered to the metal particle.

As a result, the effect described above is more effectively exhibited.

As the hydrophobic phosphorus surface treatment agent, for example, a phosphoric acid derivative, a phosphoric acid derivative, a phosphoric acid derivative, and the like can be used. Examples of the derivative include a tautomer, an esterified compound, an etherified compound, a compound in which a hydrogen atom in a structural formula is substituted with an organic substituent, and the like.

As the hydrophobic phosphorus surface treatment agent, a surface treatment agent used as a surfactant and the like can also be used. The hydrophobic phosphorus surface treatment agent preferably has a hydrophobic atom or an atomic group.

Examples of the hydrophobic atom or atomic group include a fluorine atom, an alkyl group having 3 or more carbon atoms, and an alkyl group in which at least a part of a hydrogen atom is substituted with a fluorine atom. The number of carbon atoms of the alkyl group or the alkyl group in which at least a part of the hydrogen atom is substituted with a fluorine atom is preferably 3 or more, more preferably 5 or more, and still more preferably 8 or more. Furthermore, the number of carbon atoms is preferably 10 or more and more preferably 15 or more. An upper limit of the number of carbon atoms is not particularly limited, but preferably 30, more preferably 25, and still more preferably 20. The alkyl group, the alkyl group in which at least a part of the hydrogen atom is substituted with a fluorine atom, or the like is etherified by being bonded to a phosphorus atom of the phosphorus surface treatment agent or a hydroxyl group bonded to a phosphorus atom of the phosphorus surface treatment agent.

As the hydrophobic phosphorus surface treatment agent, a fluorinated phosphorus compound, which is a phosphorus compound having at least one fluorine atom in the molecule, can be preferably used.

As a result, the hydrophobicity in a state in which the fluorinated phosphorus compound adheres to the metal particle can be further enhanced, and the dispersion stability of the metal particles in the composition for ink jet and the ejection stability by the ink jet method can be further enhanced. Further, the recorded matter produced using the recording method and the recording device of the present disclosure can be suitably arranged by the metal particles near the outer surface of the printed portion, and a property such as glossiness that is originally inherent in the metal material constituting the metal particle can be further effectively exhibited.

When the hydrophobic phosphorus surface treatment agent is a fluorinated phosphorus compound, the fluorinated phosphorus compound preferably has a perfluoroalkyl structure.

As a result, as the storage stability of the composition for ink jet and the ejection stability by the ink jet method are further enhanced, the glossiness and the abrasion resistance of the printed portion of the recorded matter produced using the composition for ink jet can be further enhanced.

The silicon compound that functions as a surface treatment agent is not limited as long as it is a compound containing a silicon atom in the molecule and has a function of modifying the surface of the metal particle, that is, a silicon surface treatment agent. However, as the silicon compound, for example, a surface treatment agent obtained by preparing silane coupling agent or tetraethoxysilane using ammonia water, and the like can be preferably used.

The composition for ink jet according to the present disclosure may contain a plurality of types of compounds as a surface treatment agent. In such a case, the same metal particles may be surface-treated with a plurality of types of surface treatment agents. Further, the composition for ink jet may contain the metal particles surface-treated with different surface treatment agents.

For example, as described above, when a metal film formed by a vapor-phase film formation method is pulverized in a liquid to form metal particles, the surface treatment of the metal particles with the surface treatment agent may be performed by containing the surface treatment agent in the liquid.

When the same particles are surface-treated with the plurality of types of surface treatment agents, the surface treatment may be performed by dividing a step into a plurality of steps corresponding to each surface treatment agent or the surface treatment may be performed with the plurality of types of surface treatment agents in the same step.

A lower limit of a content of the surface treatment agent in the composition for ink jet is not particularly limited, but preferably 0.01% by mass, more preferably 0.05% by mass, and still more preferably 0.10% by mass. In addition, an upper limit of the content of the surface treatment agent in the composition for ink jet is not particularly limited, but preferably 1.5% by mass, more preferably 1.0% by mass, and still more preferably 0.8% by mass.

As a result, as the storage stability of the composition for ink jet, the ejection stability by the ink jet method, and the like are further enhanced, the glossiness of the recorded matter produced using the recording method and the recording device of the present disclosure can be further enhanced.

The lower limit of the content of the surface treatment agent in the composition for ink jet is preferably 5.0 parts by mass, more preferably 10 parts by mass, and still more preferably 20 parts by mass with respect to 100 parts by mass of the metal particles. In addition, the upper limit of the content of the surface treatment agent in the composition for ink jet is preferably 60 parts by mass, more preferably 50 parts by mass, and still more preferably 40 parts by mass with respect to 100 parts by mass of the metal particles.

As a result, as the storage stability of the composition for ink jet, the ejection stability by the ink jet method, and the like are further enhanced, the glossiness of the recorded matter produced using the recording method and the recording device of the present disclosure can be further enhanced.

1-5-4 Polyoxyalkylene Amine Compound

The composition for ink jet according to the present disclosure may contain a polyoxyalkylene amine compound.

As a result, as dispersion stability of the composition for ink jet of the metal particles is improved, and the storage stability of the composition for ink jet, the ejection stability by the ink jet method, and the like are further enhanced, the glossiness of the recorded matter produced using the composition for ink jet can be further enhanced, and occurrence of undesired color unevenness can be further effectively prevented.

Particularly, when the metal particles are surface-treated with the above-described surface treatment agent, a synergistic effect is exhibited by using these surface treatment agents in combination, and the effect as described above is more remarkably exhibited.

The polyoxyalkylene amine compound may be any amine compound having a polyoxyalkylene structure in the molecule, but preferably at least one of a compound represented by the following Formula (1) and a salt thereof:

$$R^1-(O-R^2)_x-NH_2 \quad (1)$$

where $R^1$ is a hydrogen atom or an alkyl group having 4 or less carbon atoms, $R^2$ is an alkylene group having 5 or less carbon atoms, and x is an integer of 10 or more. In Formula (1), a plurality of types of oxyalkylene units having different conditions of $R^2$ may be provided.

As a result, as the storage stability of the composition for ink jet, the ejection stability by the ink jet method, and the like are further enhanced, the glossiness of the recorded matter produced using the recording method and the recording device of the present disclosure can be further enhanced.

As described above, the polyoxyalkylene amine compound is preferably at least one of the compound represented by Formula (1) and a salt thereof, and in particular, more preferably a compound represented by the following Formula (2) and a salt thereof:

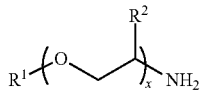

(2)

where $R^1$ is a hydrogen atom or an alkyl group having 4 or less carbon atoms, $R^2$ is a hydrogen atom or an alkyl group having 3 or less carbon atoms, and x is an integer of 10 or more. In Formula (2), a plurality of types of oxyalkylene units having different conditions of R may be provided.

As a result, as the storage stability of the composition for ink jet, the ejection stability by the ink jet method, and the like are further enhanced, the glossiness of the recorded matter produced using the recording method and the recording device of the present disclosure can be further enhanced.

$R^1$ in Formulae (1) and (2) may be a hydrogen atom or an alkyl group having 4 or less carbon atoms, but is preferably a methyl group.

As a result, as the storage stability of the composition for ink jet, the ejection stability by the ink jet method, and the like are further enhanced, the glossiness of the recorded matter produced using the recording method and the recording device of the present disclosure can be further enhanced.

$R^2$ in Formulae (2) may be a hydrogen atom or an alkyl group having 3 or less carbon atoms, but is preferably a hydrogen atom or a methyl group, and more preferably a compound represented by the following Formula (3):

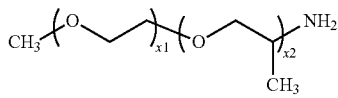

(3)

where x1 and x2 are independently of each other an integer of 1 or more, and x1+x2 are integers of 10 or more. In Formula (3), the order of oxyethylene units and oxypropylene units is no object.

As a result, as the storage stability of the composition for ink jet, the ejection stability by the ink jet method, and the like are further enhanced, the glossiness of the recorded matter produced using the recording method and the recording device of the present disclosure can be further enhanced.

Moreover, a value of x1/x2 which is a ratio of x1 to x2 in Formula (3), that is, a lower limit of a ratio of a substance amount of oxyethylene units to a substance amount of oxypropylene units in the molecule of the polyoxyalkylene amine compound is preferably 0.05, more preferably 0.15, and still more preferably 0.70. In addition, an upper limit of the value of x1/x2 is preferably 10.00, more preferably 8.00, and still more preferably 6.00.

As a result, as the storage stability of the composition for ink jet, the ejection stability by the ink jet method, and the like are further enhanced, the glossiness of the recorded matter produced using the recording method and the recording device of the present disclosure can be further enhanced.

In Formula (3), the order of oxyethylene units and oxypropylene units is no object as described above. More specifically, in Formula (3), an amino group is bonded to an end of the consecutive oxyethylene units, and a methyl group is bonded to an end of the continuous oxypropylene units, but the amino group may be bonded to the end of the consecutive oxypropylene units, and the methyl group may be bonded to the end of the consecutive oxyethylene units. Further, the compound represented by Formula (3) may be a block copolymer or a random copolymer.

A lower limit of a weight average molecular weight of the polyoxyalkylene amine compound is not particularly limited, but preferably 400, more preferably 500, still more preferably 800, and most preferably 1,000. In addition, an upper limit of the weight average molecular weight of the polyoxyalkylene amine compound is not particularly limited, but preferably 8,000, more preferably 5,000, and still more preferably 3,000.

As a result, as the storage stability of the composition for ink jet, the ejection stability by the ink jet method, and the like are further enhanced, the glossiness of the recorded matter produced using the recording method and the recording device of the present disclosure can be further enhanced.

The composition for ink jet according to the present disclosure may contain a plurality of types of compounds as polyoxyalkylene amine compounds.

A lower limit of a content of the polyoxyalkylene amine compound in the composition for ink jet is not particularly limited, but preferably 0.01% by mass, more preferably 0.02% by mass, and still more preferably 0.03% by mass. In addition, an upper limit of the content of the polyoxyalkylene amine compound in the composition for ink jet is not particularly limited, but preferably 1.0% by mass, more preferably 0.80% by mass, and still more preferably 0.60% by mass.

As a result, as the storage stability of the composition for ink jet, the ejection stability by the ink jet method, and the like are further enhanced, the glossiness of the recorded matter produced using the recording method and the recording device of the present disclosure can be further enhanced.

The lower limit of the content of the polyoxyalkylene amine compound in the composition for ink jet is preferably 0.1 parts by mass, more preferably 0.5 parts by mass, and still more preferably 1.0 parts by mass with respect to 100 parts by mass of the metal particles. In addition, the upper limit of the content of the polyoxyalkylene amine compound in the composition for ink jet is preferably 50 parts by mass, more preferably 40 parts by mass, and still more preferably 30 parts by mass with respect to 100 parts by mass of the metal particles.

As a result, as the storage stability of the composition for ink jet, the ejection stability by the ink jet method, and the like are further enhanced, the glossiness of the recorded matter produced using the recording method and the recording device of the present disclosure can be further enhanced.

When the content of the polyoxyalkylene amine compound in the composition for ink jet is XA [% by mass] and the content of the surface treatment agent in the composition for ink jet is XP [% by mass], a lower limit of a value of XA/XP is preferably 0.02, more preferably 0.05, and still more preferably 0.07. In addition, an upper limit of the value of XA/XP is preferably 3.0, more preferably 2.0, and still more preferably 1.0.

As a result, as the storage stability of the composition for ink jet, the ejection stability by the ink jet method, and the like are further enhanced, the glossiness of the recorded matter produced using the recording method and the recording device of the present disclosure can be further enhanced.

A treatment of the metal particles with the polyoxyalkylene amine compound may be performed in the same step as the surface treatment with the surface treatment agent, or may be performed in different steps. The treatment with the polyoxyalkylene amine compound may be performed before the step of the surface treatment with the surface treatment agent, or may be performed after the step of the surface treatment with the surface treatment agent.

1-5-5 Other Components

The composition for ink jet according to the present disclosure may contain components other than those described above. Examples of such a component include a leveling agent, a binder, an accelerator, a polymerization inhibitor, a photopolymerization inhibitor, a dispersant, a surfactant, a penetration promoter, a moisturizer, a colorant, a fixing agent, an antifungal agent, a preservative, an antioxidant, a chelating agent, a thickener, and a sensitizer.

The binder may be a resin, but is preferably an acrylic resin, an ester resin, a urethane resin, and the like, and more preferably an acrylic resin. When the composition contains the binder, the composition contains the binder in an amount of preferably 0.1% by mass or more, more preferably 1% by mass or less, and still more preferably 0.5% by mass or less.

As the surfactant, a silicone surfactant, a fluorine surfactant, an acetylene glycol surfactant, and the like are preferably used, and a silicone surfactant is particularly preferably used. When the composition contains the surfactant, the composition contains the surfactant in an amount of preferably 0.1% by mass or more, more preferably 1% by mass or less, and still more preferably 0.5% by mass or less.

1-5-6 Others

An upper limit of a viscosity of the composition for ink jet according to the present disclosure at 25° C. measured in accordance with JIS 28809 using a vibration viscometer is not particularly limited, but preferably 25 mPa·s, and more preferably 15 mPa·s. In addition, a lower limit of the viscosity of the composition for ink jet according to the present disclosure at 25° C. measured in accordance with JIS 28809 using a vibration viscometer is not particularly limited, but preferably 3 mPa·s.

As a result, for example, it is possible to suitably eject droplets of the composition for ink jet according to the present disclosure by the ink jet method.

2 Recording Device

Next, a recording device of the present disclosure will be described.

The recording device of the present disclosure includes an ink jet head, and the ink jet head includes a circulation flow path for circulating the composition for ink jet. Then, the recording method of the present disclosure described above is performed.

As a result, it is possible to provide a recording device capable of effectively preventing unintended precipitation of the metal pigment in the ink jet head and stably producing a recorded matter having an excellent glossiness.

The recording device of the present disclosure includes an ink jet head that ejects the composition for ink jet according to the present disclosure.

As a type of the ink jet method, a piezo type, a type of ejecting an ink by bubbles generated by heating the ink, or the like can be used, but the piezo type is preferable in terms of difficulty in deteriorating the composition for ink jet.

Hereinafter, preferred embodiments of the recording device of the present disclosure will be described in more detail with reference to the accompanying drawings.

Figure 4:
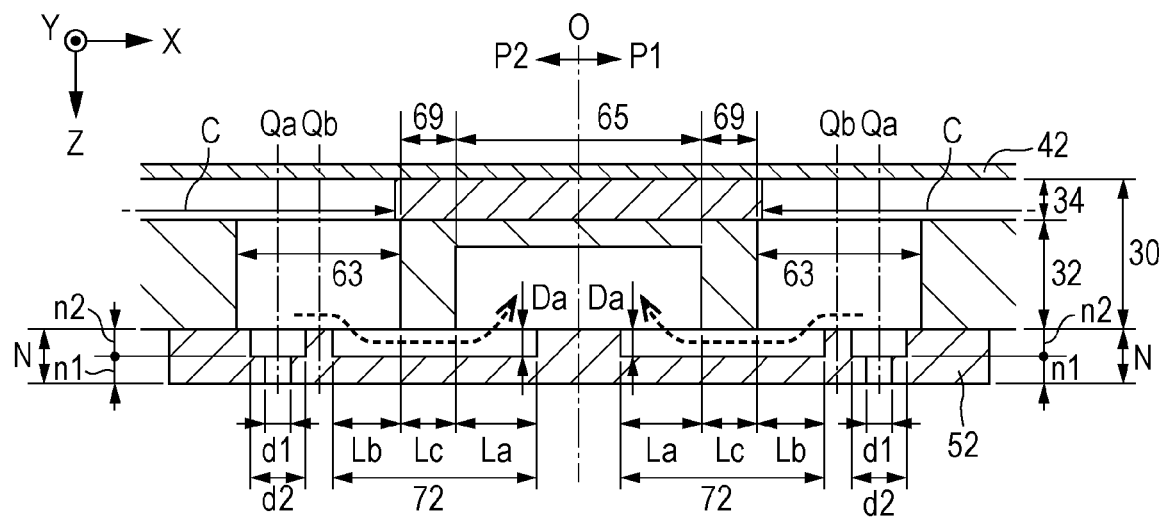
FIG. 4 is a schematic cross-sectional view illustrating an enlarged portion of the ink jet head near a circulating liquid chamber.

FIG. 1 is a schematic cross-sectional view illustrating an example of a recording device. FIG. 2 is a perspective view illustrating a configuration around a carriage of the recording device illustrated in FIG. 1. FIG. 3 is a schematic view of a cross section of an ink jet head of the recording device. FIG. 4 is a schematic cross-sectional view illustrating an enlarged portion of the ink jet head near a circulating liquid chamber. In each drawing used in the following description, the scales or relative dimensions of members in the drawing are appropriately varied for easy recognition.

The recording device of the present embodiment includes an ink jet head that has a circulation flow path for circulating the composition for ink jet and ejects the composition for ink jet to allow it to adhere to the recording medium.

2-1 Overview of Recording Device

As illustrated in FIGS. 1 and 2, the recording device 1 includes an ink jet head 2, an IR heater 3, a platen heater 4, a heating heater 5, a cooling fan 6, a preheater 7, a ventilation fan 8, a carriage 9, a platen 11, a carriage movement mechanism 13, and a transporting unit 14. In the recording device 1, operations of the entire recording device 1 are controlled by a control unit (not illustrated).

The ink jet head 2 has a configuration in which recording is performed on a recording medium M by ejecting the composition for ink jet from a nozzle of the ink jet head 2 and allowing it to adhere to the recording medium M. In this example, the ink jet head 2, which is a serial type ink jet head, is scanned multiple times in a main scanning direction relative to the recording medium M to allow the composition for ink jet to adhere to the recording medium M. The ink jet head 2 is mounted on the carriage 9 illustrated in FIG. 2. The ink jet head 2 is scanned multiple times in the main scanning direction relative to the recording medium M by an operation of the carriage movement mechanism 13 that moves the carriage 9 in a medium width direction of the recording medium M. The medium width direction is the main scanning direction of the ink jet head 2. The scanning in the main scanning direction is also referred to as a main scan.

Here, the main scanning direction is a direction in which the carriage 9 on which the ink jet head 2 is mounted moves. In FIG. 2, a width direction of the recording medium M, that is, a direction indicated by an arrow S1 and an arrow S2 is a main scanning direction MS, and a direction represented by an arrow T1→an arrow T2 is a sub-scanning direction SS. Scanning is performed in the main scanning direction, that is, either the direction of the arrow S1 or the arrow S2 in one scanning. Then, the main scan of the ink jet head 2 and a sub-scan, which is the transport of the recording medium M, are repeated multiple times to perform recording on the recording medium M. That is, the ejecting step is performed by multiple main scans in which the ink jet head 2 moves in the main scanning direction and the multiple sub-scans in which the recording medium M moves to the sub-scanning direction intersecting with the main scanning direction.

A cartridge 12 for supplying the composition for ink jet to the ink jet head 2 includes a plurality of independent cartridges. The cartridge 12 is detachably attached to the carriage 9 on which the ink jet head 2 is mounted. Each of the plurality of cartridges is filled with different types of compositions for ink jet, and the cartridge 12 supplies the composition for ink jet to each nozzle. Although an example in which the cartridge 12 is mounted on the carriage 9 is shown, the cartridge 12 is not limited to this, and may be provided in a place other than the carriage 9 and supplied to each nozzle by a supply pipe (not illustrated).

A method known in the related art can be used for ejecting of the ink jet head 2. Here, a method of ejecting droplets by using vibration of a piezoelectric element, that is, an ejecting method of forming droplets of the composition for ink jet by mechanical deformation of an electrostrictive element is used.

The recording device 1 can include a dispersion medium removing unit that removes the dispersion medium contained in the composition for ink jet when the composition for ink jet is ejected from the ink jet head 2 and adheres to the recording medium. In the illustrated configuration, the recording device 1 includes the IR heater 3 and a platen heater 4 as the dispersion medium removing unit. When performing the dispersion medium removing step, the IR heater 3, the ventilation fan 8, and the like can be used.

When the IR heater 3 is used, the recording medium M can be radiantly heated by infrared radiation from the ink jet head 2 side. As a result, the ink jet head 2 is also easily heated, and the recording medium M can be heated without being affected by its thickness as compared with a case in which the recording medium M is heated from a back surface thereof by the platen heater 4 or the like. Further, various fans may be provided to dry the composition for ink jet on the recording medium M by blowing hot air or air having the same temperature as an environment on the recording medium M.

The platen heater 4 can heat the recording medium M at a position facing the ink jet head 2 via the platen 11 so that the composition for ink jet can be quickly dried from a point in time when the composition for ink jet ejected by the ink jet head 2 adheres to the recording medium M. The platen heater 4 can conductively heat the recording medium M and is used in the ink jet recording method if necessary. However, the recording device 1 may not include the dispersion medium removing unit when a process for using the dispersion medium removing unit is not performed.

After the ejecting step, a post-heating step of heating the recording medium to dry and fix the composition for ink jet may be performed. The post-heating is referred to as secondary heating.

The heating heater 5 used in the post-heating step is a heater for drying and solidifying the composition for ink jet adhered to the recording medium M, that is, for secondary heating or secondary drying. The heating heater 5 can be used in the post-heating step. When the heating heater 5 heats the recording medium M on which an image is recorded, the dispersion medium contained in the composition for ink jet evaporates and scatters more quickly.

The recording device 1 may have the cooling fan 6. After the composition for ink jet recorded on the recording medium M is dried, the cooling fan 6 can cool the recording medium M to which the composition for ink jet is applied.

Moreover, the recording device 1 may include the preheater 7 that preheats the recording medium M before the composition for ink jet adheres to the recording medium M. Furthermore, the recording device 1 may include the ventilation fan 8 to more efficiently dry the composition for ink jet adhered to the recording medium M.

The recording device 1 includes, below the carriage 9, the platen 11 supporting the recording medium M, the carriage movement mechanism 13 for moving the carriage 9 relative to the recording medium M, and the transporting unit 14 which is a roller for transporting the recording medium M in the sub-scanning direction. Operations of the carriage movement mechanism 13 and the transporting unit 14 are controlled by a control unit (not illustrated).

2-2 Ink Jet Head Having Circulation Flow Path

In the recording device of the present embodiment, ejecting is performed by the ink jet head having a circulation flow path of at least the composition for ink jet. That is, at least the composition for ink jet is circulated through the circulation flow path. The circulation flow path has a path for the composition for ink jet to pass through a pressure chamber and flow back into the pressure chamber.

In the present embodiment, the ink jet head 2 has a circulation flow path for circulating the composition for ink jet.

FIG. 3 is a schematic view of a cross section of an ink jet head of the recording device. More specifically, FIG. 3 is a schematic cross-sectional view of the ink jet head in a cross section perpendicular to a transporting direction of the recording medium as a Y direction. In FIG. 3, a plane parallel to the surface of the recording medium M is referred to as an X-Y plane, and a direction perpendicular to the X-Y plane is hereinafter referred to as a Z direction. A direction in which the ink jet head 2 ejects the composition for ink jet corresponds to the Z direction.

A plurality of nozzles N of the ink jet head 2 are arranged in the Y direction to form a nozzle array. In the ink jet head 2, a plane that passes through a central axis parallel to the Y direction and is parallel to the Z direction, that is, a central plane O that is a Y-Z plane, is referred to as a "central plane" in the following description.

As illustrated in FIG. 3, the ink jet head 2 has a structure in which an element related to each nozzle N in a first row L1 and an element related to each nozzle N in a second row L2 are arranged symmetrically with the central plane O interposed therebetween. That is, the structure of a portion of the ink jet head 2 on a positive side from the central plane O in an X direction, that is, a first portion P1, and the structure of a portion of the ink jet head 2 on a negative side from the central plane O of the first portion P1 in the X direction, that is, a second portion P2, are substantially common. The plurality of nozzles N in the first row L1 are formed in the first portion P1, and the plurality of nozzles N in the second row L2 are formed in the second portion P2. The central plane O corresponds to a boundary between the first portion P1 and the second portion P2.

In FIG. 3 here, each nozzle N in the second row L2 and each nozzle N in the first row L1 form a nozzle array filled with the above-described composition for ink jet. Further, although a region of the ink jet head from which the composition for ink jet is ejected is not described here, the same configuration may be used.

As illustrated in FIG. 3, the ink jet head 2 includes a flow path forming portion 30. The flow path forming portion 30 is a structure for forming a flow path for supplying the composition for ink jet to the plurality of nozzles N. In the present embodiment, the flow path forming portion 30 includes a first flow path substrate 32 and a second flow path substrate 34 in a stacked manner. Each of the first flow path substrate 32 and the second flow path substrate 34 is an elongated plate member in the Y direction. The second flow path substrate 34 is installed on a surface Fa of the first flow path substrate 32 on the negative side in the Z direction by using, for example, an adhesive.

As illustrated in FIG. 3, in addition to the second flow path substrate 34, a vibration portion 42, a piezoelectric element 44, a protective member 46, and a housing portion 48 are installed on the surface Fa of the first flow path substrate 32. On the other hand, a nozzle plate 52 and a vibration absorber 54 are installed on a front side in the Z direction of the first flow path substrate 32, that is, on a surface Fb opposite to the surface Fa. Each element of the ink jet head 2 is generally an elongated plate member in the Y direction like the first flow path substrate 32 or the second flow path substrate 34, and is joined to each other by using, for example, an adhesive. A direction in which the first flow path substrate 32 and the second flow path substrate 34 are stacked, a direction in which the first flow path substrate 32 and the nozzle plate 52 are stacked, or a direction perpendicular to a surface of each element with a plate shape can be grasped as the Z direction.

The nozzle plate 52 is a plate member in which the plurality of nozzles N are formed, and is installed on the surface Fb of the first flow path substrate 32 by using, for example, an adhesive. Each of the plurality of nozzles N is a circular through-hole through which the composition for ink jet passes. The nozzle plate 52 is formed with the plurality of nozzles N forming the first row L1 and the plurality of nozzles N forming the second row L2. Specifically, the plurality of nozzles N in the first row L1 is formed along the Y direction in a region of the nozzle plate 52 on the positive side in the X direction when viewed from the central plane O, and the plurality of nozzles N in the second row L2 is formed along the Y direction in a region of the nozzle plate 52 on the negative side in the X direction. The nozzle plate 52 is a single plate member that is continuous over a portion in which the plurality of nozzles N are formed in the first row L1 and a portion in which the plurality of nozzles N are formed in the second row L2. The nozzle plate 52 is manufactured by processing a single crystal substrate of silicon by using a semiconductor manufacturing technology, for example, a processing technology such as dry etching or wet etching. However, a known material or manufacturing method can be optionally adopted for manufacturing the nozzle plate 52.

As illustrated in FIG. 3, a space Ra, a plurality of supply paths 61, and a plurality of communication paths 63 are formed in the first flow path substrate 32 for each of the first portion P1 and the second portion P2. The space Ra is an elongated opening formed along the Y direction in a plan view, that is, when viewed from the Z direction, and the supply path 61 and the communication path 63 are through-holes formed in each nozzle N. The plurality of communication paths 63 are arranged in the Y direction in a plan view, and the plurality of supply paths 61 are arranged in the Y direction between the array of the plurality of paths 63 and the space Ra. The plurality of supply paths 61 communicate with the space Ra in common. Further, any one communication path 63 overlaps the nozzle N corresponding to the communication path 63 in a plan view. Specifically, any one communication path 63 of the first portion P1 communicates with one nozzle N corresponding to the communication path 63 in the first row L1. Similarly, any one communication path 63 of the second portion P2 communicates with one nozzle N corresponding to the communication path 63 in the second row L2.

As illustrated in FIG. 3, the second flow path substrate 34 is a plate member in which a plurality of pressure chambers C for each of the first portion P1 and the second portion P2 are formed. The plurality of pressure chambers C are arranged in the Y direction. Each pressure chamber C is an elongated space formed in each nozzle N along the X direction in a plan view. The first flow path substrate 32 and the second flow path substrate 34 are manufactured by processing a silicon single crystal substrate by using, for example, a semiconductor manufacturing technology, similarly to the nozzle plate 52 described above. However, a known material and manufacturing method can be optionally adopted for manufacturing the first flow path substrate 32 and the second flow path substrate 34. As described above, the flow path forming portion 30 and the nozzle plate 52 include a substrate formed of silicon. Therefore, for example, the semiconductor manufacturing technology is used as described above, such that a fine flow path can be formed in the flow path forming portion 30 and the nozzle plate 52 with high accuracy, which is advantageous.

As illustrated in FIG. 3, the vibration portion 42 is installed on a surface of the second flow path substrate 34 opposite to the first flow path substrate 32. The vibration portion 42 is a plate member that can elastically vibrate. The second flow path substrate 34 and the vibration portion 42 can be integrally formed by selectively removing a part of the plate member having a predetermined plate thickness in a plate thickness direction from a region corresponding to the pressure chamber C.

As illustrated in FIG. 3, the surface Fa of the first flow path substrate 32 and the vibration portion 42 face each other with an interval therebetween in each pressure chamber C. The pressure chamber C is a space positioned between the surface Fa of the first flow path substrate 32 and the vibration portion 42, and causes a pressure change in the composition for ink jet filled in the space. Each pressure chamber C is, for example, a space whose longitudinal direction is the X direction, and is individually formed in each nozzle N. The plurality of pressure chambers C for each of the first row L1 and the second row L2 are arranged in the Y direction.

As illustrated in FIG. 3, an end of any one pressure chamber C adjacent to the central plane O overlaps the communication path 63 in a plan view, and an end opposite to the central plane O overlaps the supply path 61 in a plan view. Therefore, for each of the first portion P1 and the second portion P2, the pressure chamber C communicates with the nozzle N via the communication path 63, and the supply path 61 communicates with the space Ra. A throttle flow path for narrowing a flow path width is formed in the pressure chamber C, such that it is possible to add a predetermined flow path resistance.

As illustrated in FIG. 3, for each of the first portion P1 and the second portion P2, a plurality of piezoelectric elements 44 corresponding to different nozzles N are installed on a surface of the vibration portion 42 opposite to the pressure chamber C. The piezoelectric element 44 is an element that is deformed by supplying a drive signal. The plurality of piezoelectric elements 44 are arranged in the Y direction so as to correspond to each pressure chamber C. For example, any one piezoelectric element 44 is a laminate with a piezoelectric layer being interposed between two electrodes facing each other. It is possible to define a portion deformed by supplying the drive signal, that is, an active portion for vibrating the vibration portion 42 as the piezoelectric element 44. In the present embodiment, when the vibration portion 42 vibrates in conjunction with the deformation of the piezoelectric element 44, a pressure in the pressure chamber C fluctuates, such that the composition for ink jet filled in the pressure chamber C passes through the communication path 63 and the nozzle N and is ejected.

The protective member 46, which is a plate member for protecting the plurality of piezoelectric elements 44, is installed on a surface of the vibration portion 42 or the surface of the second flow path substrate 34. A material and manufacturing method of the protective member 46 are optional, but the protective member 46 can be formed by processing, for example, a silicon single crystal substrate by the semiconductor manufacturing technology, like the first flow path substrate 32 and the second flow path substrate 34. The plurality of piezoelectric elements 44 arranged in the Y direction in FIG. 3 are housed in a recess formed in a surface of the protective member 46 on the vibration portion 42 side.

An end of a wiring substrate 28 is bonded to the surface of the vibration portion 42 opposite to the flow path forming portion 30 or a surface of the flow path forming portion 30. The wiring substrate 28 is a flexible mounting component on which a plurality of wirings (not illustrated) electrically coupled to the control unit and the ink jet head 2 are formed. An end of the wiring substrate 28 that passes through an opening portion formed in the protective member 46 and an opening portion formed in the housing portion 48 and extends to the outside is coupled to the control unit. For example, a flexible wiring substrate 28 such as a flexible printed circuit or a flexible flat cable is preferably adopted.

The housing portion 48 is a case for storing the composition for ink jet supplied to the plurality of pressure chambers C and the plurality of nozzles N. The surface of the housing portion 48 on the positive side in the Z direction is joined to the surface Fa of the first flow path substrate 32 with, for example, an adhesive. A known technology or manufacturing method can be optionally adopted for manufacturing the housing portion 48. For example, the housing portion 48 can be formed by injection molding of a resin material.

As illustrated in FIG. 3, a space Rb for each of the first portion P1 and the second portion P2 is formed in the housing portion 48. The space Rb of the housing portion 48 and the space Ra of the first flow path substrate 32 communicate with each other. A space composed of the space Ra and the space Rb functions as a liquid storage chamber R for storing the composition for ink jet supplied to the plurality of pressure chambers C. The liquid storage chamber R is a common liquid chamber shared by the plurality of nozzles N. The liquid storage chamber R is formed in each of the first portion P1 and the second portion P2. The liquid storage chamber R of the first portion P1 is positioned on the positive side in the X direction when viewed on the central plane O, and the liquid storage chamber R of the second portion P2 is positioned on the negative side in the X direction with respect to the central plane O. An introduction port 482 for introducing the composition for ink jet supplied from a liquid container into the liquid storage chamber R is formed on the surface of the housing portion 48 on the side opposite to the first flow path substrate 32.

As illustrated in FIG. 3, the vibration absorber 54 for each of the first portion P1 and the second portion P2 is installed on the surface Fb of the first flow path substrate 32. The vibration absorber 54 is a flexible film that absorbs pressure fluctuations of the composition for ink jet in the liquid storage chamber R, that is, a compliance substrate. For example, the vibration absorber 54 is installed on the surface Fb of the first flow path substrate 32 so as to close the space Ra of the first flow path substrate 32 and the plurality of supply paths 61, and is composed of a wall surface, specifically, a bottom surface of the liquid storage chamber R.

As illustrated in FIG. 3, a space of the first flow path substrate 32, that is, a circulating liquid chamber 65 is formed in the surface Fb facing the nozzle plate 52. The circulating liquid chamber 65 of the first flow path substrate 32 is an elongated bottomed hole extending in the Y direction in a plan view. An opening of the circulating liquid chamber 65 is closed by the nozzle plate 52 joined to the surface Fb of the first flow path substrate 32. The circulating liquid chamber 65 is continuous over the plurality of nozzles N along, for example, the first row L1 and the second row L2. Specifically, the circulating liquid chamber 65 is formed between the array of the plurality of nozzles N in the first row L1 and the array of the plurality of nozzles N in the second row L2. Therefore, the circulating liquid chamber 65 is positioned between the communication path 63 of the first portion P1 and the communication path 63 of the second portion P2. As described above, the flow path forming portion 30 is a structure in which the pressure chamber C and the communication path 63 in the first portion P1, the pressure chamber C and the communication path 63 in the second portion P2, and the circulating liquid chamber 65 positioned between the communication path 63 in the first portion P1 and the communication path 63 in the second portion P2 are formed. The flow path forming portion 30 includes a wall-shaped portion that partitions the circulating liquid chamber 65 and each communication path 63, that is, a partition wall portion 69.

As described above, the plurality of pressure chambers C and the plurality of piezoelectric elements 44 are arranged in the Y direction in each of the first portion P1 and the second portion P2. Therefore, in other words, the circulating liquid chamber 65 can extend in the Y direction so as to be continuous over the plurality of pressure chambers C or the plurality of piezoelectric elements 44 in each of the first portion P1 and the second portion P2. Further, the circulating liquid chamber 65 and the liquid storage chamber R can extend in the Y direction with an interval therebetween, and the pressure chamber C, the communication path 63, and the nozzle N can be positioned within the interval.

As illustrated in FIG. 4, one nozzle N includes a first section n1 and a second section n2. The first section n1 and the second section n2 are cylindrical spaces that are coaxially formed and communicate with each other. The second section n2 is positioned on the flow path forming portion 30 side when viewed from the first section n1. In the present embodiment, a central axis Qa of each nozzle N is positioned opposite to the circulating liquid chamber 65 when viewed from the central axis Qb of the communication path 63. An inner diameter d2 of the second section n2 is larger than an inner diameter d1 of the first section n1. With a configuration in which each nozzle N is formed in a stepped shape as described above, there is an advantage that the flow path resistance of each nozzle N can be easily set to a desired characteristic. In the present embodiment, a central axis Qa of each nozzle N is positioned opposite to the circulating liquid chamber 65 when viewed from the central axis Qb of the communication path 63.

As illustrated in FIG. 4, a plurality of discharge paths 72 for each of the first portion P1 and the second portion P2 are formed on the surface of the nozzle plate 52 facing the flow path forming portion 30. The plurality of discharge paths 72 of the first portion P1 correspond one-to-one to the plurality of communication paths 63 corresponding to the plurality of nozzles N in the first row L1 or the first row L1. Further, the plurality of discharge paths 72 of the second portion P2 correspond one-to-one to the plurality of communication paths 63 corresponding to the plurality of nozzles N in the second row L2 or the second row L2.

The ink jet head is provided with a circulation flow path formed by combining a flow path for supplying the composition for ink jet and a flow path for discharging the composition for ink jet are combined to form a circulation flow path. The flow path for discharging the composition for ink jet is a flow path in which the composition for ink jet deviates from a path through which the composition for ink jet passes until the composition for ink jet is supplied to the ink jet head and ejected from the nozzle, and goes out of the path. The flow path for supplying the composition for ink jet is a flow path in which the composition for ink jet that has gone out of the path from the flow path for discharging the composition for ink jet enters the path again. The flow path for supplying the composition for ink jet may form a part of the path. That is, the composition for ink jet that has gone out of the path may be supplied to the path again.

For example, a combination of at least the supply path 61 and the discharge path 72 is the circulation flow path, in the example of FIG. 3. The circulation flow path is a flow path in which a liquid to be ejected from the nozzle N supplied from the supply path 61 can be discharged from a path of the liquid from the supply path 61 to the nozzle N without ejecting the liquid from the nozzle N, and supplied to the path of the liquid from the supply path 61 to nozzle N again.

Each discharge path 72 is a groove portion extending in the X direction, that is, an elongated bottomed hole, and functions as a flow path through which the composition for ink jet flows. The discharge path 72 is formed at a position separated from the nozzle N, specifically, on the circulating liquid chamber 65 side when viewed from the nozzle N corresponding to the discharge path 72. For example, the plurality of nozzles N, particularly, the second section n2 and the plurality of discharge paths 72 are collectively formed in a common process by a semiconductor manufacturing technology, for example, a processing technology such as dry etching or wet etching.

As illustrated in FIG. 4, each discharge path 72 is formed linearly with a flow path width equivalent to the inner diameter d2 of the second section n2 of the nozzle N. Further, a width of the discharge path 72 in the Y direction is smaller than a width of the pressure chamber C in the Y direction. Therefore, it is possible to increase the flow path resistance of the discharge path 72 as compared with a configuration in which the flow path width of the discharge path 72 is larger than the flow path width of the pressure chamber C. The flow path width may be larger than the flow path width of the pressure chamber C. On the other hand, a depth Da of the discharge path 72 with respect to the surface of the nozzle plate 52 is constant over the entire length. In this example, each discharge path 72 is formed to have a depth equivalent to that of the second section n2 of the nozzle N. The discharge path 72 and the second section n2 may be formed at different depths, but with such a configuration, there is an advantage that the discharge path 72 and the second section n2 can be easily formed. The "depth" of the flow path means a depth of the flow path in the Z direction, for example, a height difference between a formation surface of the flow path and a bottom surface of the flow path.

Any one discharge path 72 in the first portion P1 is positioned on the circulating liquid chamber 65 side when viewed from the nozzle N corresponding to the discharge path 72 in the first row L1. Further, any one discharge path 72 in the second portion P2 is positioned on the circulating liquid chamber 65 side when viewed from the nozzle N corresponding to the discharge path 72 in the second row L2. Then, a side of each discharge path 72 opposite to the central plane O overlaps with one communication path 63 corresponding to the discharge path 72 in a plan view. That is, the discharge path 72 communicates with the communication path 63. On the other hand, the end of each discharge path 72 adjacent to the central plane O overlaps the circulating liquid chamber 65 in a plan view. That is, the discharge path 72 communicates with the circulating liquid chamber 65. As such, each of the plurality of communication paths 63 communicates with the circulating liquid chamber 65 via the discharge path 72. Therefore, the composition for ink jet in each communication path 63 is supplied to the circulating liquid chamber 65 via the discharge path 72. That is, in the present embodiment, the plurality of communication paths 63 corresponding to the first row L1 and the plurality of communication paths 63 corresponding to the second row L2 commonly communicate with one circulating liquid chamber 65.

FIG. 4 illustrates a flow path length La of a portion of any one discharge path 72 overlapping the circulating liquid chamber 65, a flow path length of a portion of the discharge path 72 overlapping the communication path 63, that is, a flow path length Lb in the X direction, and a flow path length of a portion in the discharge path 72 overlapping the partition wall portion 69 of the flow path forming portion 30, that is, a flow path length Lc in the X direction. The flow path length Lc corresponds to a thickness of the partition wall portion 69. The partition wall portion 69 functions as a throttle portion of the discharge path 72. Therefore, the longer the flow path length Lc corresponding to the thickness of the partition wall portion 69, the greater the flow path resistance of the discharge path 72. The relative lengths of the flow path length La and the flow path length Lc are optional, but in this example, relationships that the flow path length La is longer than the flow path length Lb and the flow path length La is longer than the flow path length Lc hold. Furthermore, in this example, a relationship that the flow path length Lb is longer than the flow path length Lc holds. According to such a configuration, there is an advantage in that the composition for ink jet easily flows into the circulating liquid chamber 65 via the discharge path 72 from the communication path 63 as compared with a configuration in which the flow path length La or the flow path length Lb is shorter than the flow path length Lc.

As such, in the ink jet head 2, the pressure chamber C indirectly communicates with the circulating liquid chamber 65 via the communication path 63 and the discharge path 72. That is, the pressure chamber C and the circulating liquid chamber 65 do not directly communicate with each other. In the above configuration, when a pressure in the pressure chamber C fluctuates due to the operation of the piezoelectric element 44, a part of the composition for ink jet flowing in the communication path 63 is ejected from the nozzle N to the outside, and the remaining part of the composition for ink jet flows into the circulating liquid chamber 65 from the communication path 63 via the discharge path 72. An inertance between the communication path 63, the nozzle N, and the discharge path 72 is selected so that the composition for ink jet ejected via the nozzle N among the compositions for ink jet flowing through the communication path 63 by driving the piezoelectric element 44 once is ejected so as to exceed a circulation amount of the composition for ink jet flowing into the circulating liquid chamber 65 via the discharge path 72 among the compositions for ink jet flowing through the communication path 63. Assuming that all the piezoelectric elements 44 are driven all at once, in other words, a total of the circulation amount of the composition for ink jet flowing into the circulating liquid chamber 65 from the plurality of communication paths 63, for example, a flow rate of the composition for ink jet in the circulating liquid chamber 65 within a unit time can be larger than a total of the ejection amount by the plurality of nozzles N.

For example, the recording device 1 includes a circulation mechanism. The circulation mechanism is a mechanism for supplying, that is, circulating the composition for ink jet in the circulating liquid chamber 65 to the liquid storage chamber R. For example, the circulation mechanism includes a suction mechanism for sucking the composition for ink jet from the circulating liquid chamber 65, a pump, and a heating mechanism heating the composition for ink jet. The composition for ink jet is supplied from the circulation mechanism to the liquid storage chamber R via the introduction port 482. As a result, the composition for ink jet circulates through a path of the liquid storage chamber R→the supply path 61→the pressure chamber C→the communication path 63→the discharge path 72→the circulating liquid chamber 65→the circulation mechanism→the liquid storage chamber R. In other words, the circulation flow path has a path for the composition for ink jet to pass through the pressure chamber C and flow back into the pressure chamber C.

When the discharge path 72 for communicating the communication path 63 and the circulating liquid chamber 65 is formed in the nozzle plate 52 as such, the composition for ink jet near the nozzle N can be efficiently circulated in the circulating liquid chamber 65. Further, since the communication path 63 corresponding to the first row L1 and the communication path 63 corresponding to the second row L2 commonly communicate with the circulating liquid chamber 65 formed therebetween, there is an advantage in that a configuration of the ink jet head is simplified and, furthermore, a size of the ink jet head is reduced, as compared with a configuration in which a circulating liquid chamber communicating with each discharge path 72 corresponding to the first row L1 and a circulating liquid chamber communicating with each discharge path 72 corresponding to the second row L2 are provided separately.

The discharge path 72 and the nozzle N may not be separated from each other, but the discharge path 72 and the nozzle N may be continuous with each other. Further, in addition to the circulating liquid chamber 65, a circulating liquid chamber corresponding to each of the first portion P1 and the second portion P2 may be formed.

The ink jet head 2 includes the pressure chamber C that applies a pressure to the composition for ink jet and ejects it from the nozzle. However, as in the example of FIG. 3, it is preferable that the composition for ink jet that has passed through the pressure chamber C is circulated through the circulation flow path. As a result, the composition for ink jet that has passed through the pressure chamber C is circulated and supplied to the pressure chamber again. In this case, the discharge path can be provided at a pressure chamber or a position downstream of the pressure chamber. In this case, the ejection stability is particularly excellent, which is preferable.

Alternatively, the circulation flow path may be provided with a discharge path at a position upstream of the pressure chamber in the ink jet head, and the composition for ink jet may be discharged and circulated through the discharge path. Then, the composition for ink jet may be circulated and supplied to its position again. In this case, the composition for ink jet is circulated before passing through the pressure chamber. The position upstream of the pressure chamber is, for example, the liquid storage chamber R.

The circulation flow path is configured such that the composition for ink jet that has passed through the discharge path is circulated in the ink jet head, the composition for ink jet is supplied to the path again, the composition for ink jet that has passed through the discharge path is discharged to the outside of the ink jet head 2, and the discharged composition for ink jet is supplied to the ink jet head again. Thus, the composition for ink jet may be circulated through the circulation flow path. Among these, the former is preferable in terms of easy manufacture of the circulation flow path.

3 Recorded Matter

Next, A recorded matter according to the present disclosure will be described.

The recorded matter according to the present disclosure is produced by using the recording method and the recording device of the present disclosure as described above.

Such a recorded matter has a printed portion having an excellent glossiness and preventing the occurrence of defects.

The recorded matter according to the present disclosure may be used for any purpose, and may be applied to, for example, decorative products or other purposes. Specific examples of the recorded matter according to the present disclosure include interior decorative products for vehicle such as a console lid, a switch base, a center cluster, an interior panel, an emblem, a center console, an indicator face plate, or the like, indicators such as an operation portion of various electric devices, a decorative part exhibiting decorative characteristics, a guidepost, a logo, or the like.

Although the preferred embodiments of the present disclosure have been described above, the present disclosure is not limited thereto.

For example, the recording device to which the present disclosure is applied is not limited to the above-described one as long as the ink jet head includes a circulation flow path for circulating the composition for ink jet.

More specifically, the serial type recording device equipped with a serial type ink jet head and performing a serial type recording method has been described in the above-described embodiments. However, the recording device of the present disclosure may be a recording device including, for example, a line type ink jet head.

Moreover, the recording method of the present disclosure may have other steps in addition to the steps described above.

EXAMPLE

Next, specific examples of the present disclosure will be described.

4 Preparation of Composition for Ink Jet

Preparation Example 1

First, a polyethylene terephthalate film having a smooth surface with a surface roughness Ra of 0.02 μm or less and a thickness of 20 μm was prepared.

Next, a release layer was formed by coating one surface of the entire film with a release resin solubilized with acetone using a roll coater.

The polyethylene terephthalate film on which the release layer was formed was transported into a vacuum vapor deposition device at a speed of 5 m/s, and a film having a thickness of 15 nm formed of Al was formed under a reduced pressure.

Next, the polyethylene terephthalate film on which the Al film was formed was immersed in tetrahydrofuran and ultrasonic vibration of 40 kHz was applied thereto to obtain a dispersion of a metal pigment, which is an aggregate of metal particles formed of Al.

Next, tetrahydrofuran was removed with a centrifuge, and diethylene glycol diethyl ether was added to the resultant to obtain a suspension having a content of a metal pigment of 5% by mass.

Next, the suspension was treated with a circulation type high-power ultrasonic pulverizer to pulverize metal particles until they reached a predetermined size. In the process, 20 kHz ultrasonic waves were applied.

Next, the polyoxyalkylene amine compound represented by Formula (3) was added to the suspension at a predetermined ratio, and a heat treatment was performed at 55° C. for 1 hour under the irradiation of a 40 kHz ultrasonic wave to release the agglomeration of metal particles and disperse the metal particles in a state of the primary particles. Here, the polyoxyalkylene amine compound is a block copolymer in which an amino group is bonded to an end of the consecutive oxyethylene units and a methyl group is bonded to an end of the consecutive oxypropylene units. As the polyoxyalkylene amine compound, a polyoxyalkylene amine compound satisfying a condition in which x1/x2, a ratio between x1 and x2 in Formula (3), is 3.1 and having a weight average molecular weight of 2,000 was used.

Furthermore, FHP as a fluorinated phosphorus compound, which is a hydrophobic phosphorus surface treatment agent, was added to the polyoxyalkylene amine compound. FHP was a compound represented by 2-(perfluorohexyl)ethylphosphonic acid:$CF_3(CF_2)_5(CH_2)_2P(O)$—$(OH)_2$. The heat treatment was performed at 55° C. for three hours under the irradiation of a 28 kHz ultrasonic wave, whereby FHP was reacted on a surface of the metal particles to obtain a dispersion of the metal particles having a very low surface free energy and a high leafing property.

The obtained dispersion of the metal particles was added with diethylene glycol diethyl ether, diethylene glycol methyl ethyl ether, UC-3000 (acrylic resin, manufactured by TOAGOSEI CO., LTD.) as a binder, and BYK-333 (silicone surfactant, manufactured by BYK-Chemie Japan) as a surfactant at a predetermined ratio to obtain a composition for ink jet.

A volume average particle size D50 of the metal particles contained in the composition for ink jet thus obtained was 0.40 μm.

Preparation Examples 2 to 21

The composition for ink jet was prepared in the same manner as in Preparation Example 1, except that the compositions as shown in Tables 1 and 2 were made by using the metal pigments configured as shown in Tables 1 and 2 and changing the types and ratios of the raw materials used in preparation of the composition for ink jet. In Preparation Examples in the table, the total contents (mass basis) of components were set to 100.

For Preparation Examples, the configuration of the metal pigment contained in the composition for ink jet and the composition of the composition for ink jet are summarized in Tables 1 and 2. In the tables, the polyoxyalkylene amine compound represented by Formula (3) that satisfies a condition in which x1/x2, a ratio between x1 and x2, was 3.1 and has a weight average molecular weight of 2,000 was denoted by "POAA1", diethylene glycol diethyl ether was denoted by "DEDG", diethylene glycol methyl ethyl ether was denoted by "MEDG", 2-(perfluorohexyl)ethylphosphonic acid, which is a hydrophobic phosphorus surface treatment agent, was denoted by "FHP", a octadecylphosphonic acid, which is a hydrophobic phosphorus surface treatment agent, was denoted by "C18", dodecylphosphonic acid, which is a hydrophobic phosphorus surface treatment agent, was denoted by "C12", octylphosphonic acid, which is a hydrophobic phosphorus surface treatment agent, was denoted by "C8", a fluorinated alkylsilane compound (1H,1H,2H,2H-perfluorodecyltriethoxysilane), which is a silane coupling agent manufactured by Sigma-Aldrich Co. LLC, was denoted by "SC", a surface treatment agent prepared using ammonia water (28% by mass) of 1.6 parts by mass with respect to 1 part by mass of tetraethoxysilane was denoted by "SiO2", BYK-333 (manufactured by BYK-Chemie Japan) as a surfactant was denoted by "BYK-333", and UC-3000 (manufactured by TOAGOSEI CO., LTD.) as a binder was denoted by "UC-3000". POAA1 was a block copolymer in which an amino group was bonded to an end of the consecutive oxyethylene units and a methyl group was bonded to an end of the consecutive oxypropylene units. In addition, any 50 metal particles for the metal pigment constituting the composition for ink jet in Preparation Examples were observed. As a result, a ratio $S_1/S_0$ of an area $S_1$ [μm$^2$] when observed from a direction having a maximum projected area, that is, when viewed in a plan view to an area $S_0$ [μm$^2$] when observed from the direction having the maximum area when observed from the direction orthogonal to the observation direction was determined. When an average value thereof was determined, an average value of $S_1/S_0$ was 19 or more. In addition, the average thickness in the tables was determined by measurement by atomic force microscopy using Nanonavi E-Sweep (manufactured by SII NanoTechnology Inc.). In addition, the volume average particle size D50 in the tables was determined by measurement using Microtrac MT-3000 (laser diffraction/scattering particle size distribution measuring apparatus, manufactured by MicrotracBEL Corp.). In addition, the viscosities of the compositions for ink jet in Preparation Examples measured in accordance with JIS Z8809 using a vibration viscometer at 25° C. were all within a range of 3 mPa·s or more and 15 mPa·s or less.

TABLE 1

| | METAL PARTICLE | | | | | DISPERSION MEDIUM | |
|---|---|---|---|---|---|---|---|
| | AVERAGE THICKNESS [nm] | D50 [μm] | AVERAGE ASPECT RATIO | PRESENCE/ABSENCE OF SURFACE TREATMENT | CONTENT [% BY MASS] | CONTENT [% BY MASS] | |
| | | | | | | DEDG | MEDG |
| PREPARATION EXAMPLE 1 | 15 | 0.40 | 27 | PRESENCE | 0.30 | 25.0 | RESIDUE |
| PREPARATION EXAMPLE 2 | 15 | 0.40 | 27 | PRESENCE | 0.50 | 25.0 | RESIDUE |
| PREPARATION EXAMPLE 3 | 15 | 0.40 | 27 | PRESENCE | 1.0 | 25.0 | RESIDUE |
| PREPARATION EXAMPLE 4 | 15 | 0.40 | 27 | PRESENCE | 2.0 | 25.0 | RESIDUE |
| PREPARATION EXAMPLE 5 | 15 | 0.40 | 27 | PRESENCE | 3.0 | 25.0 | RESIDUE |
| PREPARATION EXAMPLE 6 | 15 | 0.40 | 27 | PRESENCE | 4.0 | 25.0 | RESIDUE |
| PREPARATION EXAMPLE 7 | 10 | 0.40 | 40 | PRESENCE | 1.0 | 25.0 | RESIDUE |
| PREPARATION EXAMPLE 8 | 13 | 0.40 | 31 | PRESENCE | 1.0 | 25.0 | RESIDUE |
| PREPARATION EXAMPLE 9 | 19 | 0.40 | 21 | PRESENCE | 1.0 | 25.0 | RESIDUE |
| PREPARATION EXAMPLE 10 | 15 | 0.40 | 27 | PRESENCE | 1.0 | 25.0 | RESIDUE |
| PREPARATION EXAMPLE 11 | 15 | 0.40 | 27 | PRESENCE | 1.0 | 25.0 | RESIDUE |

| | POLYOXYALKYLENE AMINE COMPOUND CONTENT [% BY MASS] | SURFACE TREATMENT AGENT CONTENT [% BY MASS] | | | | | | OTHER COMPONENTS CONTENT [% BY MASS] | |
|---|---|---|---|---|---|---|---|---|---|
| | POAA1 | FHP | C18 | C12 | C8 | SC | SiO2 | UC-3000 | BYK-333 |
| PREPARATION EXAMPLE 1 | 0.06 | 0.3 | — | — | — | — | — | 0.3 | 0.2 |
| PREPARATION EXAMPLE 2 | 0.10 | 0.5 | — | — | — | — | — | 0.3 | 0.2 |
| PREPARATION EXAMPLE 3 | 0.20 | 1.0 | — | — | — | — | — | 0.3 | 0.2 |
| PREPARATION EXAMPLE 4 | 0.40 | 2.0 | — | — | — | — | — | 0.3 | 0.2 |
| PREPARATION EXAMPLE 5 | 0.60 | 3.0 | — | — | — | — | — | 0.3 | 0.2 |
| PREPARATION EXAMPLE 6 | 0.80 | 4.0 | — | — | — | — | — | 0.3 | 0.2 |
| PREPARATION EXAMPLE 7 | 0.20 | 1.0 | — | — | — | — | — | 0.3 | 0.2 |
| PREPARATION EXAMPLE 8 | 0.20 | 1.0 | — | — | — | — | — | 0.3 | 0.2 |
| PREPARATION EXAMPLE 9 | 0.20 | 1.0 | — | — | — | — | — | 0.3 | 0.2 |
| PREPARATION EXAMPLE 10 | 0.20 | — | 1.0 | — | — | — | — | 0.3 | 0.2 |
| PREPARATION EXAMPLE 11 | 0.20 | — | — | — | — | 1.0 | — | 0.3 | 0.2 |

TABLE 2

| | METAL PARTICLE | | | | | DISPERSION MEDIUM | |
|---|---|---|---|---|---|---|---|
| | AVERAGE THICKNESS [nm] | D50 [μm] | AVERAGE ASPECT RATIO | PRESENCE/ABSENCE OF SURFACE TREATMENT | CONTENT [% BY MASS] | CONTENT [% BY MASS] | |
| | | | | | | DEDG | MEDG |
| PREPARATION EXAMPLE 12 | 15 | 0.40 | 27 | PRESENCE | 1.0 | 25.0 | RESIDUE |
| PREPARATION EXAMPLE 13 | 15 | 0.40 | 27 | ABSENCE | 1.0 | 25.0 | RESIDUE |
| PREPARATION EXAMPLE 14 | 15 | 0.40 | 27 | ABSENCE | 0.50 | 25.0 | RESIDUE |

TABLE 2-continued

| | | | | | | | |
|---|---|---|---|---|---|---|---|
| PREPARATION EXAMPLE 15 | 15 | 0.20 | 27 | PRESENCE | 1.0 | 25.0 | RESIDUE |
| PREPARATION EXAMPLE 16 | 15 | 0.70 | 27 | PRESENCE | 1.0 | 25.0 | RESIDUE |
| PREPARATION EXAMPLE 17 | 22 | 0.40 | 18 | PRESENCE | 1.0 | 25.0 | RESIDUE |
| PREPARATION EXAMPLE 18 | 26 | 0.40 | 15 | ABSENCE | 1.0 | 25.0 | RESIDUE |
| PREPARATION EXAMPLE 19 | 30 | 0.40 | 13 | ABSENCE | 1.0 | 25.0 | RESIDUE |
| PREPARATION EXAMPLE 20 | 15 | 0.40 | 27 | PRESENCE | 1.0 | 25.0 | RESIDUE |
| PREPARATION EXAMPLE 21 | 15 | 0.40 | 27 | PRESENCE | 1.0 | 25.0 | RESIDUE |

| | POLYOXYALKYLENE AMINE COMPOUND CONTENT [% BY MASS] | SURFACE TREATMENT AGENT CONTENT [% BY MASS] | | | | | | OTHER COMPONENTS CONTENT [% BY MASS] | |
|---|---|---|---|---|---|---|---|---|---|
| | POAA1 | FHP | C18 | C12 | C8 | SC | SiO2 | UC-3000 | BYK-333 |
| PREPARATION EXAMPLE 12 | 0.20 | — | — | — | — | — | 1.0 | 0.3 | 0.2 |
| PREPARATION EXAMPLE 13 | 0.20 | — | — | — | — | — | — | 0.3 | 0.2 |
| PREPARATION EXAMPLE 14 | 0.10 | — | — | — | — | — | — | 0.3 | 0.2 |
| PREPARATION EXAMPLE 15 | 0.20 | 1.0 | — | — | — | — | — | 0.3 | 0.2 |
| PREPARATION EXAMPLE 16 | 0.20 | 1.0 | — | — | — | — | — | 0.3 | 0.2 |
| PREPARATION EXAMPLE 17 | 0.20 | 1.0 | — | — | — | — | — | 0.3 | 0.2 |
| PREPARATION EXAMPLE 18 | 0.20 | — | — | — | — | — | — | 0.3 | 0.2 |
| PREPARATION EXAMPLE 19 | 0.20 | — | — | — | — | — | — | 0.3 | 0.2 |
| PREPARATION EXAMPLE 20 | 0.20 | — | — | 1.0 | — | — | — | 0.3 | 0.2 |
| PREPARATION EXAMPLE 21 | 0.20 | — | — | — | 1.0 | — | — | 0.3 | 0.2 |

5 Production of Recorded Matter

Example 1

First, a recording device (nozzle density of nozzle row: 360 npi, the number of nozzles: 360) was prepared by modifying SC-S80650 manufactured by Seiko Epson Corporation to have a configuration illustrated in FIGS. 1 to 4, and was filled with the composition for ink jet of Preparation Example 1. After confirming that all the nozzles of the recording device were normally ejected without pulling out or bending, a ratio of the circulation flow rate of the composition for ink jet flowing through the circulation flow path to the maximum ejection amount of the ink jet head was adjusted to 5.0. In this state, droplets of the composition for ink jet of Preparation Example 1 were continuously ejected for two hours, and the composition for ink jet adhered to vinyl chloride film (Scotchal graphic film, IJ8150 manufactured by 3M) as a recording medium so that an adhesion amount of a solid content of the composition for ink jet was set to 3 mg/inch$^2$ and a recording resolution was set to 1,440×1,440 dpi, to obtain a recorded matter. At this time, a medium temperature of a platen was set to 45° C., and a medium temperature of an afterheater was set to 50° C.

Examples 2 to 20

A recorded matter was produced in the same manner as in Example 1, except that the type of the composition for ink jet was changed as shown in Table 3, and the ratio of the circulation flow rate of the composition for ink jet flowing through the circulation flow path to the maximum ejection amount of the ink jet head was adjusted as shown in Table 3.

Comparative Examples 1 to 3

A recorded matter was produced in the same manner as in Example 1 except that the type of the composition for ink jet was changed as shown in Table 3.

Comparative Example 4

As the recording device, an ink jet head having no circulation flow path was used in the above recording device. Except for this, a recorded matter was produced in the same manner as in Example 2.

Comparative Examples 5 to 7

A recorded matter was produced in the same manner as in Comparative Example 4 except that the type of the composition for ink jet was changed as shown in Table 3.

6 Evaluation

The following evaluations were performed for Examples and Comparative Examples.

6-1 Gloss Stability At the time of producing the recorded matters according to Examples and Comparative Examples, a gloss value of a recorded portion formed by adhering the composition for ink jet to the recording medium was measured every 10 minutes from start of the ejection, the maximum value and the minimum value of each measurement value was determined until the ejection of the composition for ink jet was completed, and a difference between the maximum value and the minimum value was determined from the result and evaluated according to the following criteria. It can be said that the smaller the value is, the better the gloss stability is. A level of B or higher means a good level.

The glossiness was measured using a gloss meter, MINOLTA MULTI GLOSS 268, under a condition of a fanning angle of 60°.

AA: The difference between the maximum value and the minimum value is 5° or less.

A: The difference between the maximum value and the minimum value is more than 5° and 10° or less.

B: The difference between the maximum value and the minimum value is more than 10° and 20° or less.

D: The difference between the maximum value and the minimum value is more than 20°.

6-2 Gloss Value

An average value of the gloss values determined every 10 minutes was determined in 6-1, and evaluated according to the following criteria. It can be said that the larger the value is, the better the gloss value is. A level of B or higher means a good level.

AA: The average gloss value is 600° or more.

A: The average gloss value is less than 600° and 500° or more.

B: The average gloss value is less than 500° and 400° or more.

D: The average gloss value is less than 400°.

6-3 Ejection Stability

At the time of producing the recorded matters according to Examples and Comparative Examples, presence/absence of ejection failure for each nozzle was inspected every 10 minutes from start of the ejection, and a nozzle with no ejection or flight bending was defined as an ejection failure nozzle, thereby determining a ratio of the ejection failure nozzle at each point in time. From the results, the average value of each time zone was determined as an average ejection failure nozzle rate and evaluated according to the following criteria. It can be said that the smaller the value is, the better the ejection stability is. A level of C or higher means a good level.

A: The average ejection failure nozzle rate is less than 10%.

B: The average ejection failure nozzle rate is 10% or more and less than 20%.

C: The average ejection failure nozzle rate is 20% or more and less than 30%.

D: The average ejection failure nozzle rate is 30% or more.

The results are summarized in Table 3 together with production conditions of the recorded matters according to Examples and Comparative Examples. In Table 3, the ratio of the circulation flow rate of the composition for ink jet flowing through the circulation flow path to the maximum ejection amount of the ink jet head is represented as a "circulation flow rate ratio".

TABLE 3

| | TYPE OF COMPOSITION FOR INK JET | PRESENCE/ ABSENCE OF CIRCULATION | CIRCULATION FLOW RATE RATIO | EVALUATION | | |
|---|---|---|---|---|---|---|
| | | | | GLOSS STABILITY | GLOSS VALUE | EJECTION STABILITY |
| EXAMPLE 1 | PREPARATION EXAMPLE 1 | PRESENCE | 5.0 | AA | B | A |
| EXAMPLE 2 | PREPARATION EXAMPLE 2 | PRESENCE | 5.0 | A | B | A |
| EXAMPLE 3 | PREPARATION EXAMPLE 3 | PRESENCE | 5.0 | A | A | A |
| EXAMPLE 4 | PREPARATION EXAMPLE 4 | PRESENCE | 5.0 | B | A | A |
| EXAMPLE 5 | PREPARATION EXAMPLE 5 | PRESENCE | 5.0 | B | A | B |
| EXAMPLE 6 | PREPARATION EXAMPLE 6 | PRESENCE | 5.0 | B | A | C |
| EXAMPLE 7 | PREPARATION EXAMPLE 7 | PRESENCE | 5.0 | AA | AA | A |
| EXAMPLE 8 | PREPARATION EXAMPLE 8 | PRESENCE | 5.0 | AA | A | A |
| EXAMPLE 9 | PREPARATION EXAMPLE 9 | PRESENCE | 5.0 | B | B | B |
| EXAMPLE 10 | PREPARATION EXAMPLE 10 | PRESENCE | 5.0 | AA | AA | A |
| EXAMPLE 11 | PREPARATION EXAMPLE 11 | PRESENCE | 5.0 | B | B | A |
| EXAMPLE 12 | PREPARATION EXAMPLE 12 | PRESENCE | 5.0 | B | B | B |
| EXAMPLE 13 | PREPARATION EXAMPLE 13 | PRESENCE | 5.0 | B | B | D |
| EXAMPLE 14 | PREPARATION EXAMPLE 14 | PRESENCE | 5.0 | B | B | D |
| EXAMPLE 15 | PREPARATION EXAMPLE 15 | PRESENCE | 5.0 | A | B | A |
| EXAMPLE 16 | PREPARATION EXAMPLE 16 | PRESENCE | 5.0 | B | A | B |
| EXAMPLE 17 | PREPARATION EXAMPLE 3 | PRESENCE | 1.0 | B | A | A |
| EXAMPLE 18 | PREPARATION EXAMPLE 3 | PRESENCE | 7.0 | AA | A | B |
| EXAMPLE 19 | PREPARATION EXAMPLE 20 | PRESENCE | 5.0 | AA | A | A |
| EXAMPLE 20 | PREPARATION EXAMPLE 21 | PRESENCE | 5.0 | A | B | A |
| COMPARATIVE EXAMPLE 1 | PREPARATION EXAMPLE 17 | PRESENCE | 5.0 | D | B | C |
| COMPARATIVE EXAMPLE 2 | PREPARATION EXAMPLE 18 | PRESENCE | 5.0 | D | D | D |
| COMPARATIVE EXAMPLE 3 | PREPARATION EXAMPLE 19 | PRESENCE | 5.0 | D | D | D |
| COMPARATIVE EXAMPLE 4 | PREPARATION EXAMPLE 2 | ABSENCE | — | D | D | C |
| COMPARATIVE EXAMPLE 5 | PREPARATION EXAMPLE 14 | ABSENCE | — | D | D | D |
| COMPARATIVE EXAMPLE 6 | PREPARATION EXAMPLE 17 | ABSENCE | — | D | D | C |
| COMPARATIVE EXAMPLE 7 | PREPARATION EXAMPLE 18 | ABSENCE | — | D | D | D |

As is clear from Table 3, excellent results were obtained in the present disclosure. On the other hand, in Comparative Examples, satisfactory results were not obtained.

What is claimed is:

1. A recording method of performing recording on a recording medium by using a recording device including an ink jet head, the recording method comprising:
   electing a composition for ink jet from the ink jet head, wherein,
   the composition for ink jet contains a metal pigment,
   the metal pigment is formed of a plurality of metal particles having a scale shape,
   the ink jet head includes a circulation flow path for circulating the composition for ink jet, and
   an average thickness of the metal particles determined by atomic force microscopy is 19 nm or less, wherein
   an average aspect ratio of the metal particles, which is a ratio of a volume average particle size D50 of the metal particles to the average thickness of the metal particles determined by the atomic force microscopy, is 20 or more and 2,000 or less.

2. The recording method according to claim 1, wherein a content of the metal particles in the composition for ink jet is 0.2% by mass or more and 4.0% by mass or less.

3. The recording method according to claim 1, wherein the metal particles are formed of a material containing aluminum or an aluminum alloy.

4. The recording method according to claim 1, wherein the metal particles are surface-treated with a phosphorus compound or a silicon compound.

5. The recording method according to claim 1, wherein a volume average particle size D50 of the metal particles is 0.20 μm or more and 1.00 μm or less.

6. The recording method according to claim 1, wherein the average thickness of the metal particles determined by the atomic force microscopy is 5 nm or more and 19 nm or less.

7. A recording device comprising:
   an ink jet head, wherein
   the ink jet head includes a circulation flow path for circulating a composition for ink jet, and
   the recording method according to claim 1 is performed.

8. A recording method of performing recording on a recording medium by using a recording device including an ink jet head, the recording method comprising:
   ejecting a composition for ink jet from the ink jet head, wherein
   the composition for ink jet contains a metal pigment,
   the metal pigment is formed of a plurality of metal particles having a scale shape,
   the ink jet head includes a circulation flow path for circulating the composition for ink jet, and
   an average thickness of the metal particles determined by atomic force microscopy is 19 nm or less, wherein
   the composition for ink jet is a solvent-based ink.

9. A recording device comprising:
   an ink jet head, wherein
   the ink jet head includes a circulation flow path for circulating a composition for ink jet, and
   the recording method according to claim 8 is performed.

10. The recording method according to claim 8, wherein a content of the metal particles in the composition for ink jet is 0.2% by mass or more and 4.0% by mass or less.

11. The recording method according to claim 8, wherein the metal particles are formed of a material containing aluminum or an aluminum alloy.

12. The recording method according to claim 8, wherein the metal particles are surface-treated with a phosphorus compound or a silicon compound.

13. The recording method according to claim 8, wherein a volume average particle size D50 of the metal particles is 0.20 μm or more and 1.00 μm or less.

14. The recording method according to claim 8, wherein the average thickness of the metal particles determined by the atomic force microscopy is 5 nm or more and 19 nm or less.

15. A recording method of performing recording on a recording medium by using a recording device including an ink jet head, the recording method comprising:
   ejecting a composition for ink jet from the ink jet head, wherein
   the composition for ink jet contains a metal pigment,
   the metal pigment is formed of a plurality of metal particles having a scale shape,
   the ink jet head includes a circulation flow path for circulating the composition for ink jet, and
   an average thickness of the metal particles determined by atomic force microscopy is 19 nm or less, wherein
   a ratio of a circulation flow rate of the composition for ink jet flowing through the circulation flow path to a maximum ejection amount of the ink jet head is 0.50 or more and 15 or less.

16. The recording method according to claim 15, wherein a content of the metal particles in the composition for ink jet is 0.2% by mass or more and 4.0% by mass or less.

17. The recording method according to claim 15, wherein the metal particles are formed of a material containing aluminum or an aluminum alloy.

18. The recording method according to claim 15, wherein the metal particles are surface-treated with a phosphorus compound or a silicon compound.

19. The recording method according to claim 15, wherein a volume average particle size D50 of the metal particles is 0.20 μm or more and 1.00 μm or less.

20. The recording method according to claim 15, wherein the average thickness of the metal particles determined by the atomic force microscopy is 5 nm or more and 19 nm or less.

* * * * *